US012078098B2

(12) United States Patent
Smith et al.

(10) Patent No.: US 12,078,098 B2
(45) Date of Patent: Sep. 3, 2024

(54) ROTARY AIRLOCK COMBUSTION ENGINE

(71) Applicants: Timothy Smith, Bartlett, TN (US); Daniel Smith, Drummonds, TN (US); Matthew Smith, Collierville, TN (US)

(72) Inventors: Timothy Smith, Bartlett, TN (US); Daniel Smith, Drummonds, TN (US); Matthew Smith, Collierville, TN (US)

( * ) Notice: Subject to any disclaimer, the term of this patent is extended or adjusted under 35 U.S.C. 154(b) by 0 days.

(21) Appl. No.: 18/125,051

(22) Filed: Mar. 22, 2023

(65) Prior Publication Data

US 2023/0366346 A1 Nov. 16, 2023

Related U.S. Application Data

(60) Provisional application No. 63/329,963, filed on Apr. 12, 2022.

(51) Int. Cl.

| | |
|---|---|
| ***F02B 55/08*** | (2006.01) |
| ***F02B 53/04*** | (2006.01) |
| ***F02B 55/02*** | (2006.01) |
| ***F02B 55/14*** | (2006.01) |

(52) U.S. Cl.

CPC .............. *F02B 55/08* (2013.01); *F02B 53/04* (2013.01); *F02B 55/02* (2013.01); *F02B 55/14* (2013.01)

(58) Field of Classification Search

CPC .......... F02B 53/04; F02B 55/02; F02B 55/08; F02B 55/14

See application file for complete search history.

(56) References Cited

U.S. PATENT DOCUMENTS

| | | | | |
|---|---|---|---|---|
| 4,154,208 | A | 5/1979 | Kunieda et al. | |
| 4,741,308 | A | 5/1988 | Ballinger | |
| 6,503,072 | B2 * | 1/2003 | Nardi | F01C 1/20 418/225 |
| 6,662,774 | B1 | 12/2003 | Toll | |

(Continued)

FOREIGN PATENT DOCUMENTS

| | | | |
|---|---|---|---|
| KR | 1019890002702 | B1 | 7/1989 |

OTHER PUBLICATIONS

International Search Report and Written Opinion for corresponding patent application No. PCT/US2023/015888, dated Jul. 13, 2023, 10 pages.

*Primary Examiner* — Audrey B. Walter

(74) *Attorney, Agent, or Firm* — Patterson Intellectual Property Law, P.C.; Ryan D. Levy

(57) ABSTRACT

An internal combustion rotary engine comprising a housing, at least one sun wheel centered about the central axis and positioned within one of at least one cylindrical compartment of the housing, and including a sun wheel circumference and at least one semicylindrical receptable defined along the sun wheel circumference, at least one lobe extending from an inner cylindrical surface of the compartment, and at least one planet wheel received in the at least one semicylindrical receptable of the sun wheel. The at least one planet wheel may be configured to engage the inner cylindrical surface of the cylindrical compartment and include at least one indentation configured to be received by the at least one lobe when the at least one planet wheel rotates along the inner cylindrical surface. Air intake and compression as well as combustion and exhaust may be performed within the same or different compartments of the at least one cylindrical compartment.

13 Claims, 18 Drawing Sheets

(56) References Cited

U.S. PATENT DOCUMENTS

| | | | | |
|---|---|---|---|---|
| 6,932,047 | B2 * | 8/2005 | Watkins | F01C 19/025<br>418/227 |
| 2014/0069367 | A1 | 3/2014 | Watkins | |

* cited by examiner

ROTARY AIRLOCK COMBUSTION ENGINE

CROSS-REFERENCES TO RELATED APPLICATIONS

This application claims benefit of the following patent application which is hereby incorporated by reference: U.S. Provisional Application No. 63/329,963 filed Apr. 12, 2022, entitled "Rotary Airlock Combustion Engine."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present invention relates generally to internal combustion engines. More particularly, the present invention pertains to a rotary-type internal combustion engine. In other optional embodiments, the present invention relates to applications involving pumps, small engines, generators, industrial equipment, and the like.

2. Description of the Prior Art

Much work has been done in the field of internal combustion engines of both the reciprocating and rotary types. The present invention is directed to an improvement on the rotary type internal combustion engine.

BRIEF SUMMARY

An exemplary object of the present disclosure may be to provide a new and improved rotary-type internal combustion engine that may be self-driven or externally driven. An exemplary such engine may desirably feature a hot side configured for combustion and exhaust and a cold side configured for air intake and compression. Alternatively, chambers may alternate between cold and hot chambers on a singular sun wheel engine design in accordance with the present disclosure. Compressed air from the cold side may be supplied to the hot side, via an airlock, for combustion.

The hot side may include a hot side sun wheel and at least one hot side planet wheel carried by the hot side sun wheel. The cold side may include a cold side sun wheel and at least one cold side planet wheel carried by the cold side sun wheel. Each of the hot side sun wheel and the cold side sun wheel may revolve on a straight-line shaft. In other optional embodiments, split shafts or the like may be used for operation of one or more of the wheels.

The exemplary such engine may further feature at least one hot side lobe and at least one cold side lobe positioned on the inner surface of the housing (or engine block). Each of the at least one hot side planet wheel and the at least one cold side planet wheel may include a cut out configured to receive the at least one hot side lobe or at least one cold side lobe, respectively.

Each of the at least one hot side planet wheel and the at least one cold side planet wheel are configured to complete a seal against the inner surface of the housing. The at least one hot side planet wheel in combination with the at least one hot side lobe creates at least one expanding chamber for combustion and exhaust. The at least one cold side planet wheel in combination with the at least one cold side lobe creates at least one expanding chamber for intake and compression.

The exemplary such engine may further feature the use of the sun wheel with planet wheels on the outer edges of the sun wheel that revolve around the inside of the housing (engine block) and have matching cut outs for lobes that are positioned on the inside diameter of the engine housing/block. This feature is what allows for expanding chambers to be created as the engine rotates which is where the intake, compression, combustion, and exhaust occur.

The exemplary such engine may be applicable for, but not limited to, turbo prop airplanes, Any propeller driven vehicle (e.g., aircraft, hovercraft, boat, ship, etc. . . . ), any impeller driven vehicle (e.g., jetskis, jetboats, etc.), any vehicle powered by a traditional internal combustion engine (e.g., cars, trucks, ATVs, motorcycles, etc.), large and small yard equipment (e.g., lawn mowers, weed eaters, chainsaws, etc.), power equipment (e.g., pneumatic and hydraulic pumps, generators, compressors, etc.), steam powered machines (e.g., power generating and industrial facilities that utilize boilers and/or nuclear energy, boats, etc.), electricity generation (e.g., replacing turbines at dams and spillways, replacing steam powered turbines at industrial facilities, home hydroelectric generation from streams, etc.), industrial equipment (e.g., forklifts, cranes, manlifts, etc.), and hydraulic powered equipment (e.g., heavy duty hydraulic winches and other rotating hydraulic powered equipment) including instances where this component is being driven by hydraulic pressure to power wheels or other components.

In a particular embodiment, an exemplary internal combustion rotary engine as disclosed herein may include a housing, a sun wheel, at least one lobe, and at least one planet wheel. The housing may be configured to receive a crankshaft along a central axis of the housing. The housing may have at least one cylindrical compartment having an inner cylindrical surface. The sun wheel may be positioned within the at least one cylindrical compartment and centered about the central axis. The sun wheel may include a sun wheel circumference and at least one semicylindrical receptable defined along the sun wheel circumference. The at least one lobe may extend from the inner cylindrical surface of the at least one compartment. The at least one lobe may be configured to contact the sun wheel. The at least one planet wheel may be received in the at least one semicylindrical receptable of the sun wheel. The at least one planet wheel may be configured to engage the inner cylindrical surface of the at least one cylindrical compartment. The at least one planet wheel may include at least one indentation configured to be received by the at least one lobe when the at least one planet wheel rotates along the inner cylindrical surface.

In an exemplary aspect according to the above-referenced embodiment, each of the at least one lobe may be equally spaced around an inner cylindrical surface circumference of the inner cylindrical surface of the at least one compartment.

In another exemplary aspect according to the above-referenced embodiment, the inner cylindrical surface circumference may be divisible by a planet wheel circumference of each of the at least one planet wheel.

In another exemplary aspect according to the above-referenced embodiment, each of the at least one planet wheel may include a planet wheel circumference depending at least in part on a distance between a leading edge portion of the at least one lobe along the inner cylindrical surface. In accordance with this aspect, the planet wheel circumference of each of the at least one planet wheel may be less than or equal to the distance between the leading edge portion of the at least one lobe.

In another exemplary aspect according to the above-referenced embodiment, the distance between the leading edge portion of the at least one lobe may be divisible by the planet wheel circumference of each of the at least one planet wheel.

In another exemplary aspect according to the above-referenced embodiment, each of the at least one planet wheel may include a planet wheel rotational axis positioned interiorly of the sun wheel circumference.

In another exemplary aspect according to the above-referenced embodiment, each of the at least one planet wheel may be rotatably coupled to the sun wheel using a planet wheel axle positioned along the planet wheel rotational axis.

In another exemplary aspect according to the above-referenced embodiment, the inner cylindrical surface may include a plurality of teeth elongated parallel to the central axis and spaced apart along an inner cylindrical surface circumference of the inner cylindrical surface between the at least one lobe. In accordance with this aspect, the at least one planet wheel may include a plurality of planet wheel teeth configured to mesh with the plurality of teeth of the inner cylindrical surface when the at least one planet wheel rotates along the inner cylindrical surface.

In another exemplary aspect according to the above-referenced embodiment, a leading edge chamber may be defined between the at least one planet wheel and a leading edge portion of the at least one lobe as the at least one planet wheel approaches the at least one lobe when rotating along the inner cylindrical surface. In accordance with this aspect, a trailing edge chamber may be defined between the at least one planet wheel and a trailing edge portion of the at least one lobe as the at least one planet wheel departs from the at least one lobe when rotating along the inner cylindrical surface. Further in accordance with this aspect, one of air compression or exhaust may be performed by the internal combustion rotary engine in the leading edge chamber, and one of combustion or air intake may be performed by the internal combustion rotary engine in the trailing edge chamber.

In another exemplary aspect according to the above-referenced embodiment, the at least one cylindrical compartment may include at least one hot compartment for performing combustion and exhaust and may further include at least one cold compartment for performing air intake and air compression. The at least one cold compartment may be separated from the at least one hot compartment by a divider wall of the housing.

In another exemplary aspect according to the above-referenced embodiment, a plurality of internal combustion rotary engines may be sequentially couplable to the crankshaft.

In another embodiment, an exemplary internal combustion rotary engine as disclosed herein may include a housing, a cold side planetary gear set, and a hot side planetary gear set. The housing may be configured to receive a crankshaft along a central axis of the housing. The housing may include a cold side compartment separated from a hot side compartment along the central axis. The cold side compartment may include a cold side inner cylindrical surface having at least one cold side lobe extending therefrom. The hot side compartment may include a hot side inner cylindrical surface having at least one hot side lobe extending therefrom. The cold side planetary gear set may have a cold side sun wheel centered about the central axis and at least one cold side planet wheel rotatably coupled to the cold side sun wheel and sealed between the cold side sun wheel and the cold side inner cylindrical surface. The cold side sun wheel may include a cold side sun wheel circumference and at least one cold side semicircular opening defined along the cold side sun wheel circumference and configured to at least partially receive the at least one cold side planet wheel. The at least one cold side planet wheel may include at least one cold side planet wheel indentation configured to at least partially receive the at least one cold side lobe when the at least one cold side planet wheel rotates along the cold side inner cylindrical surface. The hot side planetary gear set may have a hot side sun wheel centered about the central axis and at least one hot side planet wheel rotatably coupled to the hot side sun wheel and sealed between the hot side sun wheel and the hot side inner cylindrical surface. The hot side sun wheel may include a hot side sun wheel circumference and at least one hot side semicircular opening defined along the hot side sun wheel circumference and configured to at least partially receive the at least one hot side planet wheel. The at least one hot side planet wheel may include at least one hot side planet wheel indentation configured to at least partially receive the at least one hot side lobe when the at least one hot side planet wheel rotates along the hot side inner cylindrical surface.

In an exemplary aspect according to the above-referenced embodiment, each of the at least one cold side lobe may be aligned with each of the at least one hot side lobe relative to the central axis.

In another exemplary aspect according to the above-referenced embodiment, the at least one cold side lobe may be equal in number to the at least one hot side lobe.

In another exemplary aspect according to the above-referenced embodiment, an air intake chamber may be defined between the at least one cold side planet wheel and a cold side trailing edge portion of the at least one cold side lobe as the at least one cold side planet wheel departs from the at least one cold side lobe when rotating along the cold side inner cylindrical surface.

In another exemplary aspect according to the above-referenced embodiment, at least one air intake passageway may be defined between an exterior surface of the housing and the cold side inner cylindrical surface proximate to the cold side trailing edge portion of the at least one cold side lobe.

In another exemplary aspect according to the above-referenced embodiment, an air compression chamber may be defined between the at least one cold side planet wheel and a cold side leading edge portion of the at least one cold side lobe as the at least one cold side planet wheel approaches the at least one cold side lobe when rotating along the cold side inner cylindrical surface. In accordance with this aspect, a combustion chamber may be defined between the at least one hot side planet wheel and a hot side trailing edge portion of the at least one hot side lobe as the at least one hot side planet wheel departs from the at least one hot side lobe when rotating along the hot side inner cylindrical surface.

In another exemplary aspect according to the above-referenced embodiment, at least one compression passageway may be defined between the cold side inner cylindrical surface proximate to the cold side leading edge portion of the at least one cold side lobe and the hot side inner cylindrical surface proximate to the hot side trailing edge portion of the at least one hot side lobe.

In another exemplary aspect according to the above-referenced embodiment, an exhaust chamber may be defined between the at least one hot side planet wheel and a hot side leading edge portion of the at least one hot side lobe as the at least one hot side planet wheel approaches the at least one hot side lobe when rotating along the hot side inner cylindrical surface.

In another exemplary aspect according to the above-referenced embodiment, at least one exhaust passageway may be defined between an exterior surface of the housing and the hot side inner cylindrical surface proximate to the hot side leading edge portion of the at least one hot side lobe.

DETAILED DESCRIPTION

Figure 1A:
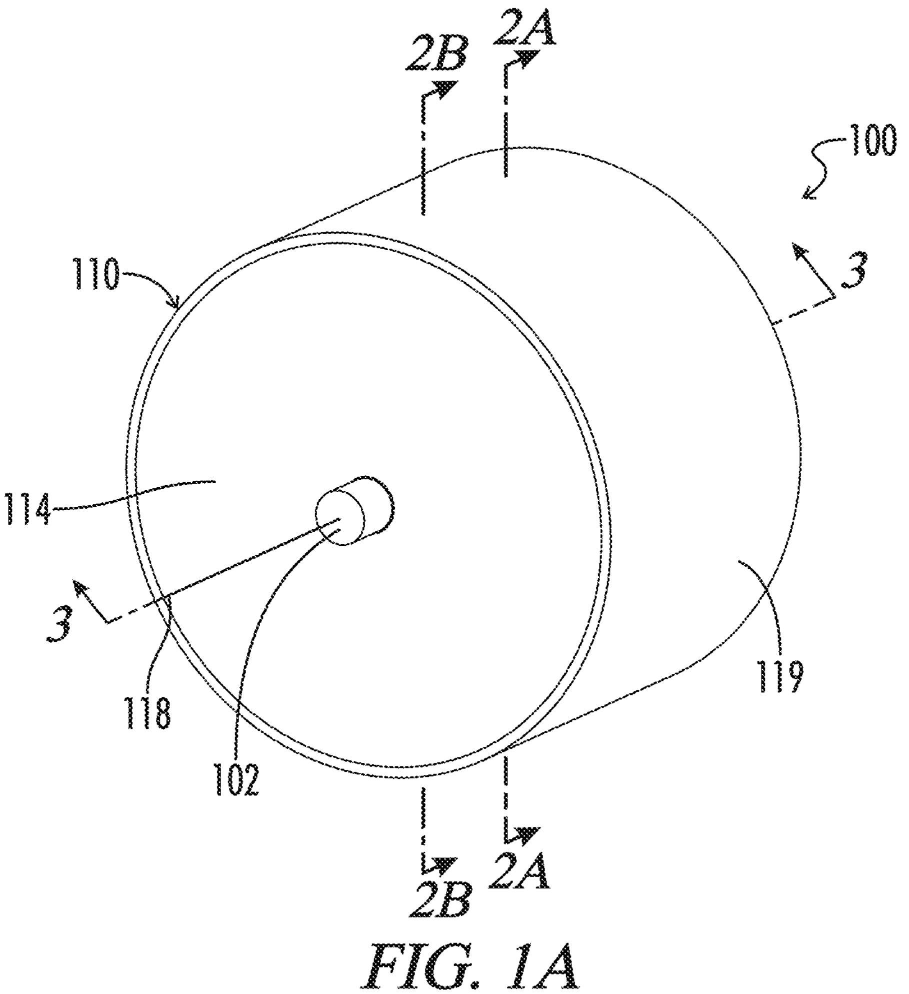
FIG. 1A is a perspective view of an internal combustion rotary engine in accordance with the present disclosure.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Referring to FIGS. 1A-10L, various embodiments of an internal combustion rotary engine 100 are shown. The internal combustion rotary engine 100 may also be referred to herein as a rotary airlock combustion engine 100 or an engine 100. The engine 100 may include a housing 110. The housing 110 may also be referred to herein as an engine block 110. The housing 110 may include at least one cylindrical compartment 111 having an inner cylindrical surface 112. In certain optional embodiments, the inner cylindrical surface 112 may be toothed or include ridges (shown in FIGS. 2A-2B and 5B-5C). In other optional embodiments, the inner cylindrical surface 112 may be smooth (shown in FIGS. 4A-4B).

The housing 110 may be configured to receive the crankshaft 102 along a central axis 118 of the housing 110. Accordingly, the inner cylindrical surface 112 may be centered about and surround at least a portion of the crankshaft 102. The crankshaft 102 may also be referred to herein as a driveshaft 102. In certain optional embodiments, other crankshaft styles may be utilized, including but limited to split crankshafts, single piece crankshafts, fully built crankshafts, semi built crankshafts, welded crankshafts, forged crankshafts, cast crankshafts, and billet crankshafts.

The engine 100 may further include a cold side 120 and a hot side 140, which are illustrated in more detail in FIGS. 2A-4B. The cold side 120 may also be referred to herein as a cold side compartment 120 or cold compartment 120, for example, of the at least one compartment 111. The hot side 140 may also be referred to herein as a hot side compartment 140 or hot compartment 140, for example, of the at least one compartment 111. The cold side 120 may include a cold side inner cylindrical surface 121 with at least one cold side lobe 122 extending therefrom. Similarly, the hot side 140 may include a hot side inner cylindrical surface 141 with at least one hot side lobe 142 extending therefrom.

Figure 3:
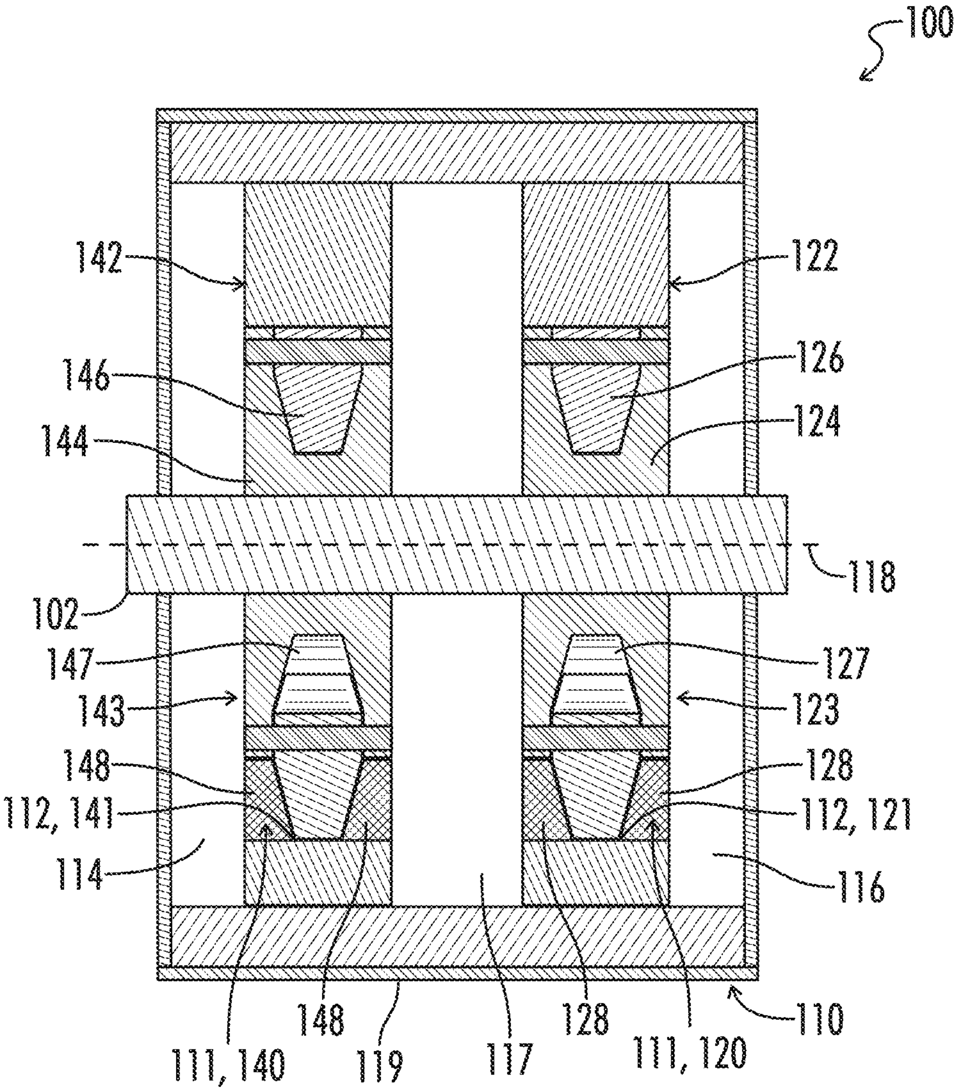
FIG. 3 is a cross-sectional view of the internal combustion rotary engine of FIG. 1A taken along lines 3-3 of FIG. 1A in accordance with the present disclosure.

Referring to FIG. 3, the engine 100 may further include a front housing cover plate 114 adjacent to the hot side 140, a rear housing cover plate 116 adjacent to the cold side 120, and a divider wall 117 separating the cold side 120 and the hot side 140. Alternative embodiments may not utilize the front housing cover plate 114, the rear housing cover plate 116, and the divider wall 117. Instead, a front housing chamber, a rear housing chamber, and a central chamber may be utilized to provide an oil reservoir for lubrication and cooling.

The cold side 120 may house a cold side planetary gear set 123 having a cold side sun wheel 124 centered about the central axis 118 and at least one cold side planet wheel 126 rotatably coupled to the cold side sun wheel 124. The at least one cold side planet wheel 126 may be sealed between the cold side sun wheel 124 and the cold side inner cylindrical surface 121. The cold side sun wheel 124 may include a cold side sun wheel circumference 125 and at least one cold side sun wheel semicircular opening 129 defined along the cold side sun wheel circumference 125. The at least one cold side sun wheel semicircular opening 129 may also be referred to herein as at least one cold side sun wheel semicircular receptable 129. The at least one cold side sun wheel semicircular opening 129 may be configured to receive the at least one cold side planet wheel 126. Each of the at least one cold side planet wheel 126 may include at least one indentation 127 configured to at least partially receive the at least one cold side lobe 122 when the at least one cold side planet wheel 126 moves within the housing 110 (e.g., rotates along the cold side inner cylindrical surface 121). The at least one indentation 127 may also be referred to herein as at least one cold side planet wheel indentation 127 or a cut out 127.

The cold side sun wheel 124 may be wider (e.g., in a direction parallel to the central axis 118) than the at least one cold side planet wheel 126. The cold side 120 may further include cold side seals 128 that are configured to maintain a seal between the sides of the at least one cold side planet wheel 126 and the sides (e.g., the rear housing cover plate 116 and the divider wall 117) of the cold side 120, and further seal between the outer edge of the cold side sun wheel 124 (e.g., as shown by the circumference 125) and the cold side inner cylindrical surface 121. The at least one cold side planet wheel 126 and the cold side seals 128 may have a flat or tapered profile. At least one cold side chamber 130 may be defined between the at least one cold side planet wheel 126 and the at least one cold side lobe 122. The cold side seals 128 may also be referred to as a cold side seal walls 128 and may be attached or integrally formed with the housing 110.

The hot side 140 may house a hot side planetary gear set 143 having a hot side sun wheel 144 centered about the central axis 118 and at least one hot side planet wheel 146 rotatably coupled to the hot side sun wheel 144. The at least one hot side planet wheel 146 may be sealed between the hot side sun wheel 144 and the hot side inner cylindrical surface 141. The hot side sun wheel 144 may include a hot side sun wheel circumference 145 and at least one hot side sun wheel semicircular opening 149 defined along the hot side sun wheel circumference 145. The at least one hot side sun wheel semicircular opening 149 may also be referred to herein as at least one hot side sun wheel semicircular receptable 149. The at least one hot side sun wheel semicircular opening 149 may be configured to receive the at least one hot side planet wheel 146. Each of the at least one hot side planet wheel 146 may include at least one indentation 147 configured to at least partially receive the at least one hot side lobe 142 when the at least one hot side planet wheel 146 moves within the housing 110 (e.g., rotates along the hot side inner cylindrical surface 141. The at least one indentation 147 may also be referred to herein as at least one hot side planet wheel indentation 147 or a cut out 147.

The hot side sun wheel 144 may be wider (e.g., in a direction parallel to the central axis 118) than the at least one cold side planet wheel 146. The hot side 140 may further include hot side seals 148 that are configured to maintain a seal between the at least one hot side planet wheel 146 and the side walls (e.g., the front housing cover plate 114 and the divider wall 117) of the hot side 140, and further seal between the outer edge of the hot side sun wheel 144 (e.g., as shown by the circumference 145) and the hot side inner cylindrical surface 141. The at least one hot side planet wheel 146 and the hot side seals 148 may have a flat or tapered profile. At least one hot side chamber 150 may be defined between the at least one hot side planet wheel 146 and the at least one hot side lobe 142. The hot side seals 148 may also be referred to as a hot side seal walls 148 and may be attached or integrally formed with the housing 110.

Figure 2A:
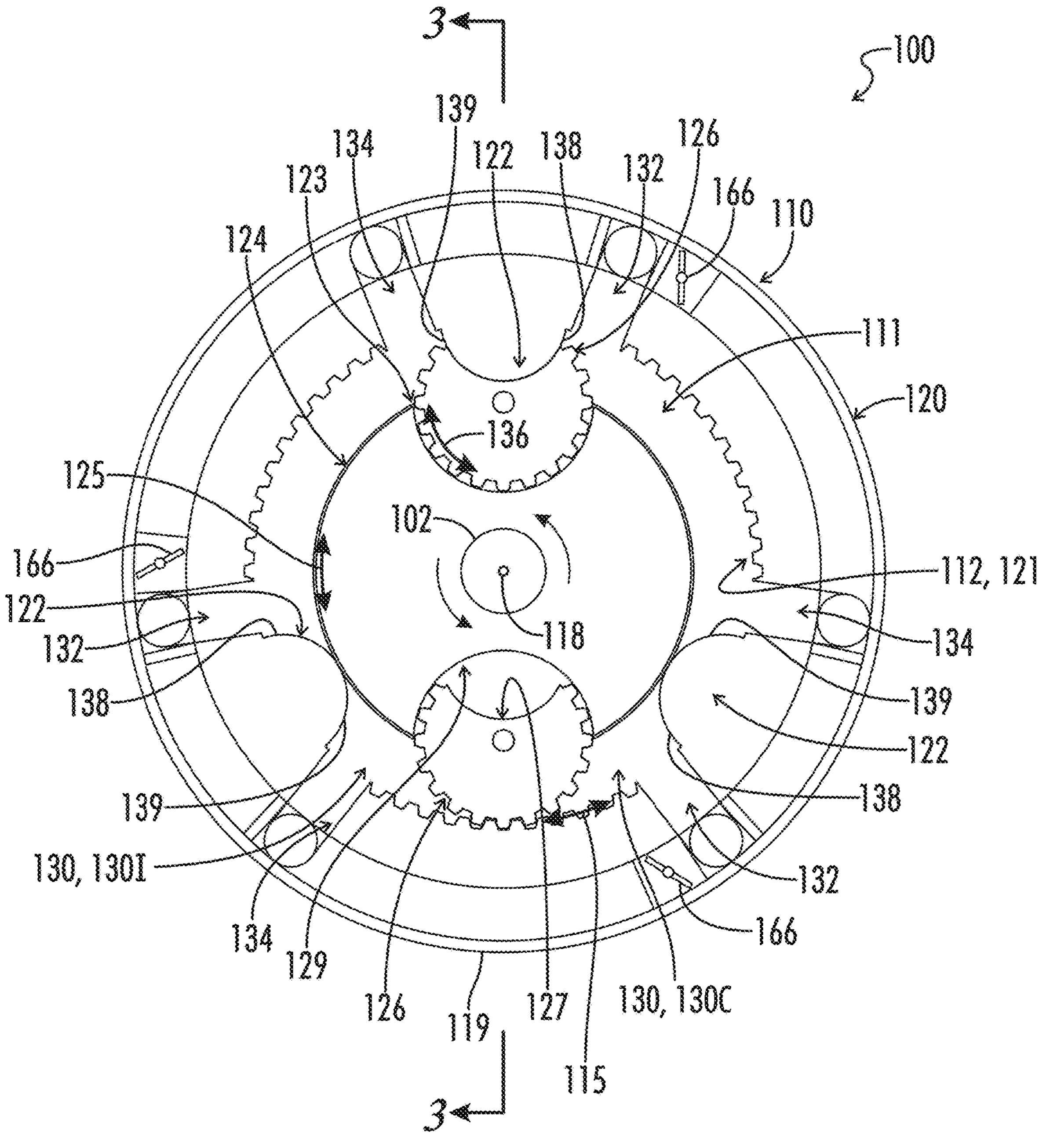
FIG. 2A is a cross-sectional view of the internal combustion rotary engine of FIG. 1A taken along lines 2A-2A of FIG. 1A in accordance with the present disclosure.
Figure 4A:
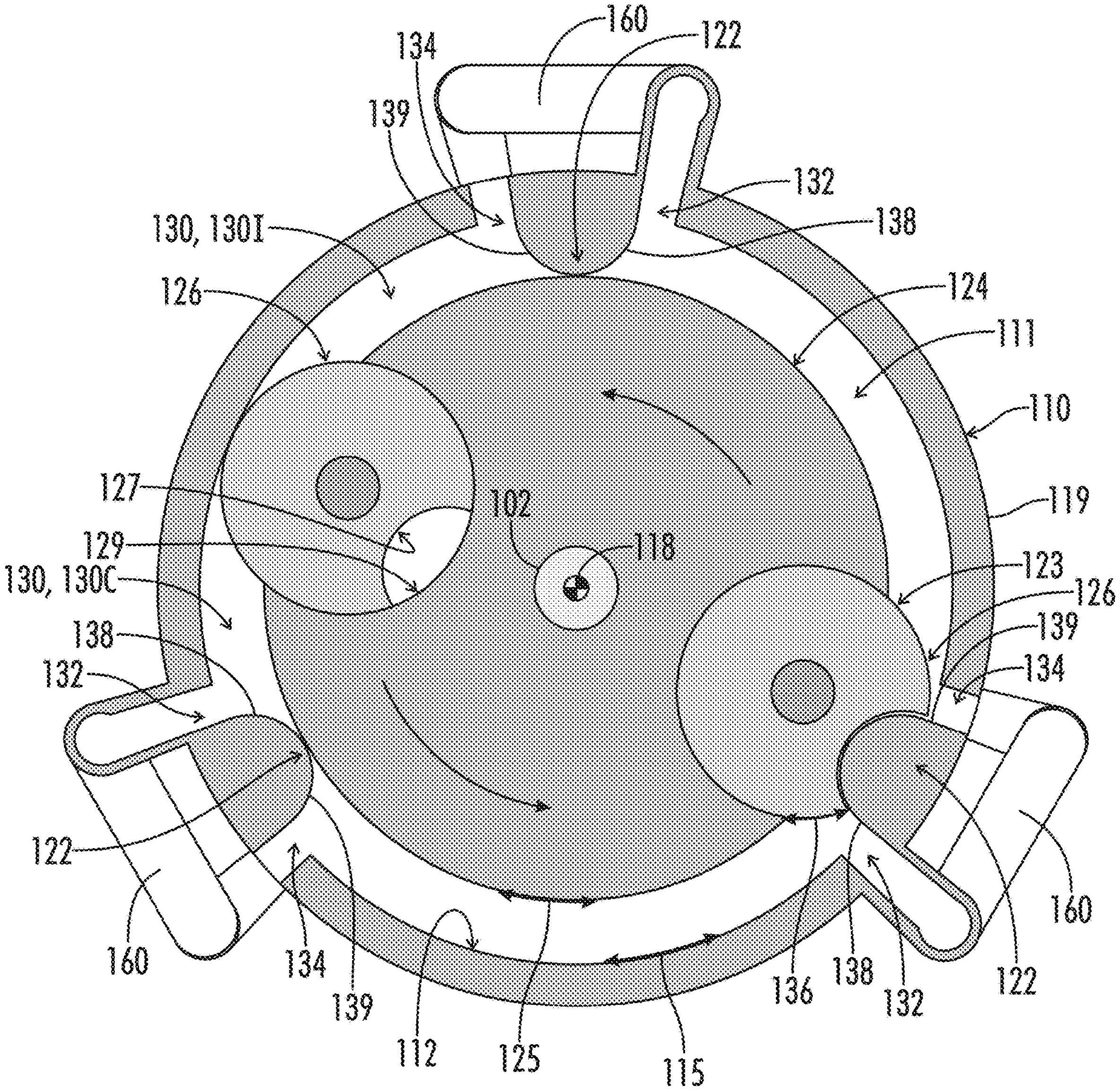
FIG. 4A is a cross-sectional view of an embodiment of internal combustion rotary engine of FIG. 3 in accordance with the present disclosure.
Figure 5A:
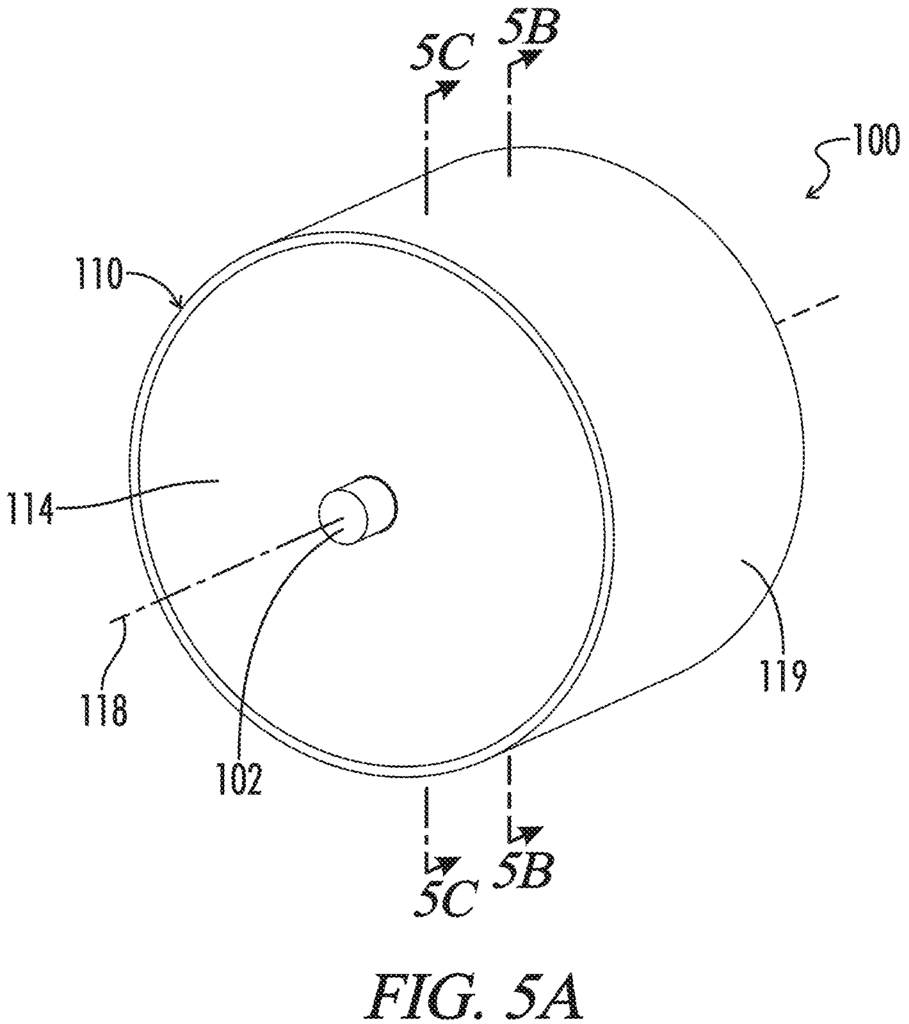
FIG. 5A is a perspective view of an internal combustion rotary engine in accordance with the present disclosure.
Figure 5B:
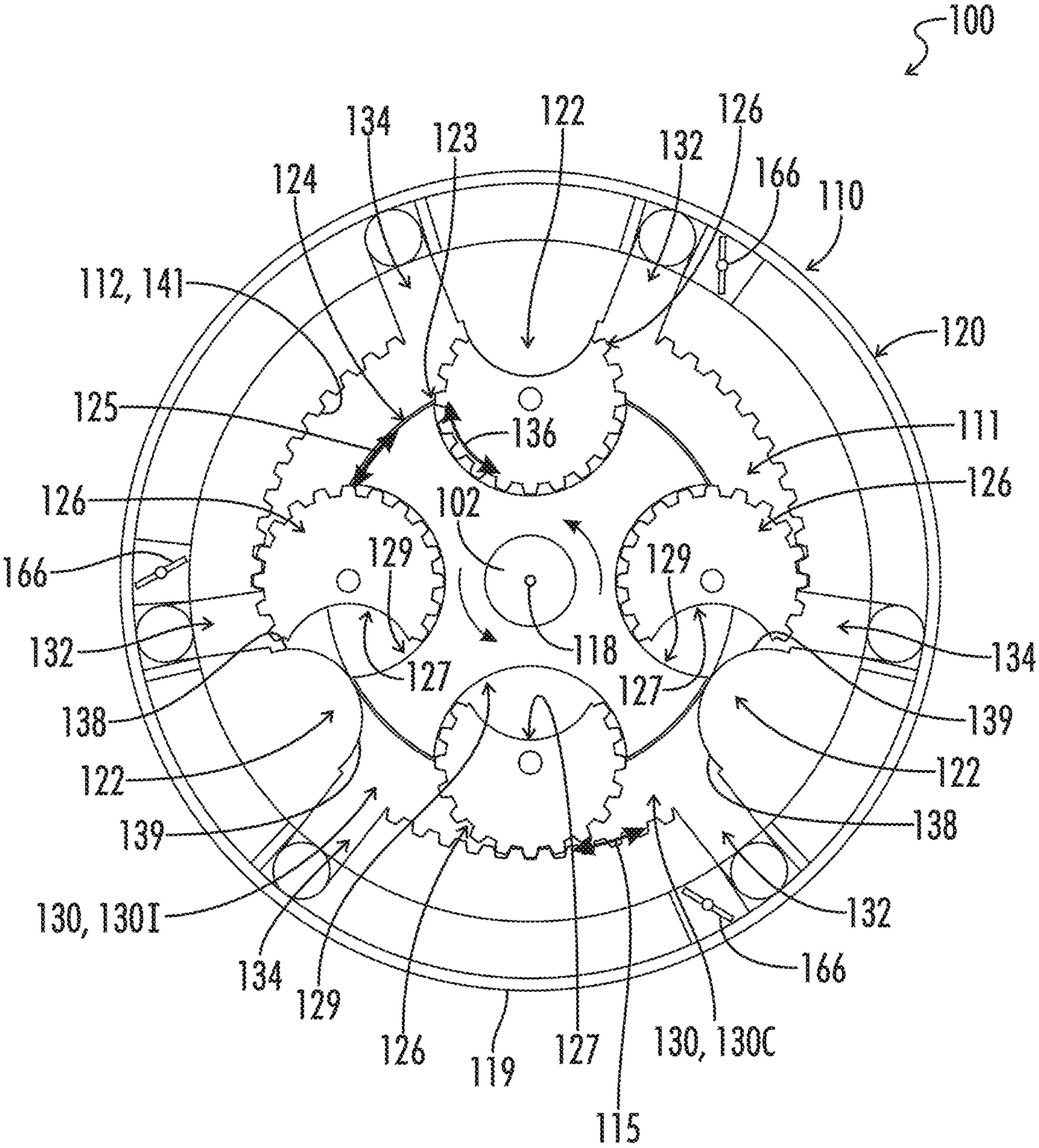
FIG. 5B is a cross-sectional view of the internal combustion rotary engine of FIG. 5A taken along lines 5B-5B of FIG. 5A in accordance with the present disclosure.

Referring to FIGS. 2A, 4A, and 5B, the cold side sun wheel 124 may rotate in a counterclockwise direction, as illustrated by the directional arrows. In other embodiments, the cold side sun wheel 124 may rotate in a clockwise direction, however, only the counterclockwise direction will be discussed. As the cold side sun wheel 124 turns, for example, counterclockwise, the at least one cold side planet wheel 126 approaches the at least one cold side lobe 122, thus defining an air compression chamber 130C of the at least one cold side chamber 130. The air compression chamber 130C may be defined between the at least one cold side planet wheel 126 and a cold side leading edge portion 138 of the at least one cold side lobe 122 approached by the at least one cold side planet wheel 126 when rotating along the cold side inner cylindrical surface 121. An air intake chamber 1301 may be defined between the cold side planet wheel 126 and a cold side trailing edge portion 139 of the at least one cold side lobe 122 departed from by the at least one cold side planet wheel 126 when rotating along the cold side inner cylindrical surface 121.

Figure 1B:
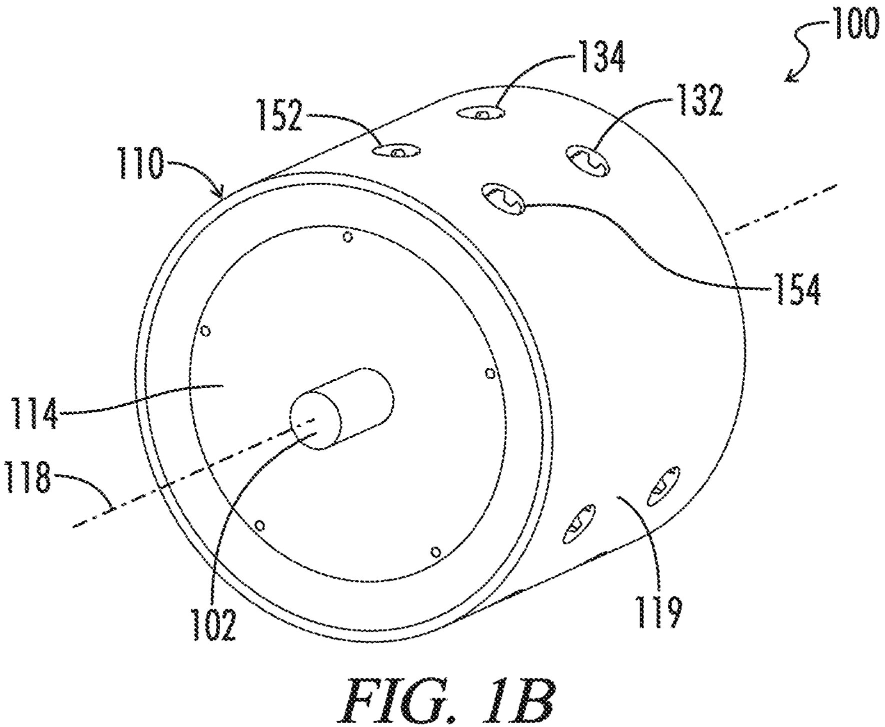
FIG. 1B is a perspective view of an internal combustion rotary engine with openings open to an exterior surface of the housing in accordance with the present disclosure.
Figure 6:
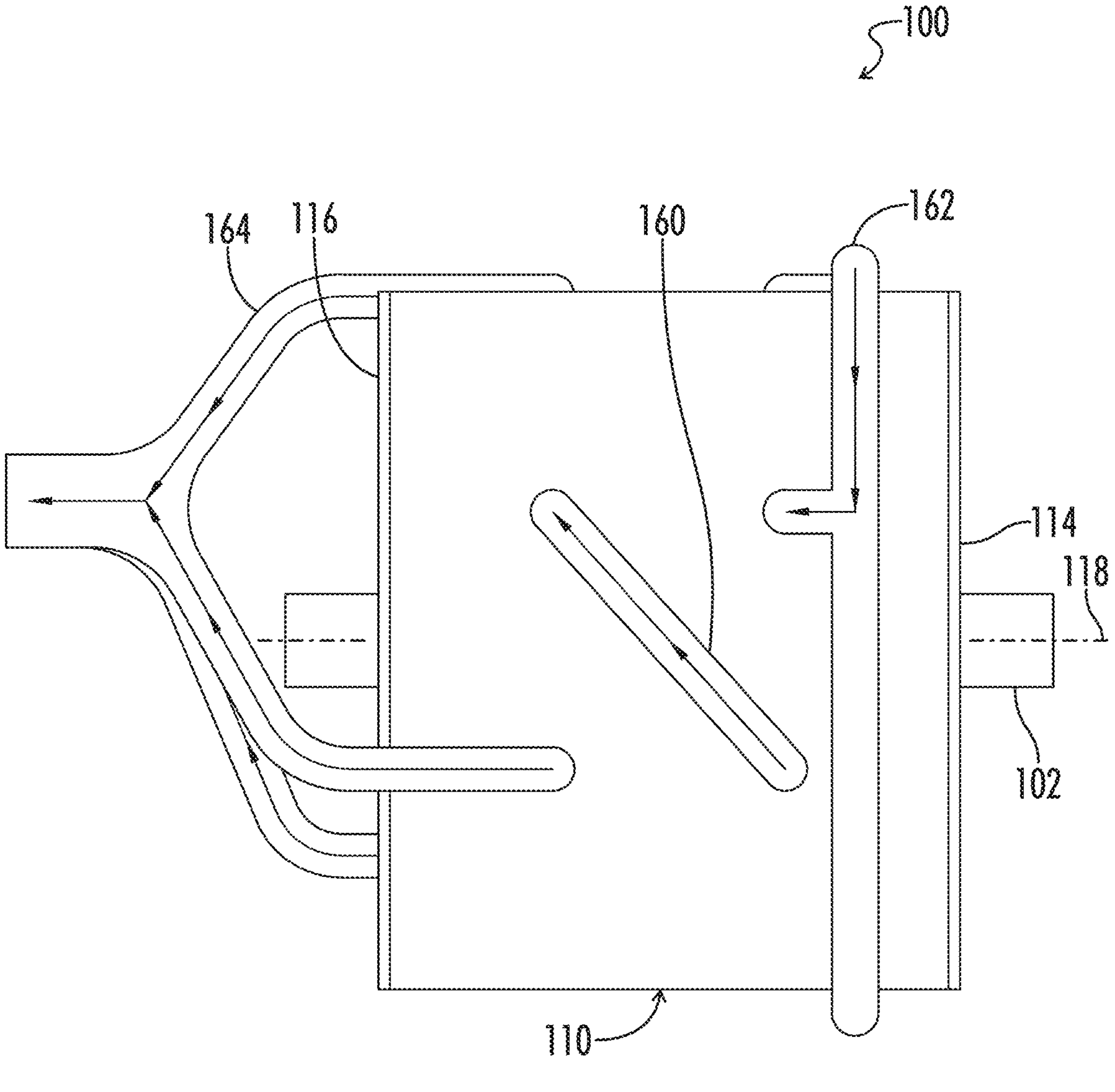
FIG. 6 is a side elevation view of an embodiment of the internal combustion rotary engine of FIG. 1B in accordance with the present disclosure.

As the at least one cold side planet wheel 126 approaches the cold side leading edge portion 138 of the at least one cold side lobe 122 air pressure builds up (e.g., the air is compressed) and may be forced through a cold air output 132 associated with the cold side leading edge portion 138 and transferred to the hot side 140 through an airlock passageway 160 (shown in FIGS. 4A and 6). The cold air output 132 may also be referred to herein as a cold air output opening 132 or an air output passageway 132. The airlock passageway 160 may also be referred to herein as a compression passageway 160. A different airlock passageway may be associated with each of the at least one cold side lobe 122. Each airlock passageway 160 may be defined within the housing 110 of the internal combustion rotary engine 100 or external to the housing 110. The cold air output 132 may be defined in the cold side inner cylindrical surface 121 proximate the cold side leading edge portion 138 of each of the at least one cold side lobe 122. A cold air intake 134 may be defined in the cold side inner cylindrical surface 121 proximate the cold side trailing edge portion 139 of each of the at least one cold side lobe 122. The cold air intake 134 may also be referred to herein as an air intake passageway 134. The cold air intake 134 may be open to an exterior surface 119 of the housing 110, as illustrated in FIG. 1B. The cold air intake 134 may serve to intake air into the cold side 120 as the at least one cold side planet wheel 126 departs from the cold side trailing edge portion 139 of the at least one cold side lobe 122. The at least one cold air intake 134 may be coupled to an intake manifold 162 (shown in FIG. 6). In certain optional embodiments, the airlock passageway 160 may include a throttle valve 166 for controlling the fuel/air ratio or the like. Other similar valves may be incorporated elsewhere in the internal combustion rotary engine 100.

Figure 2B:
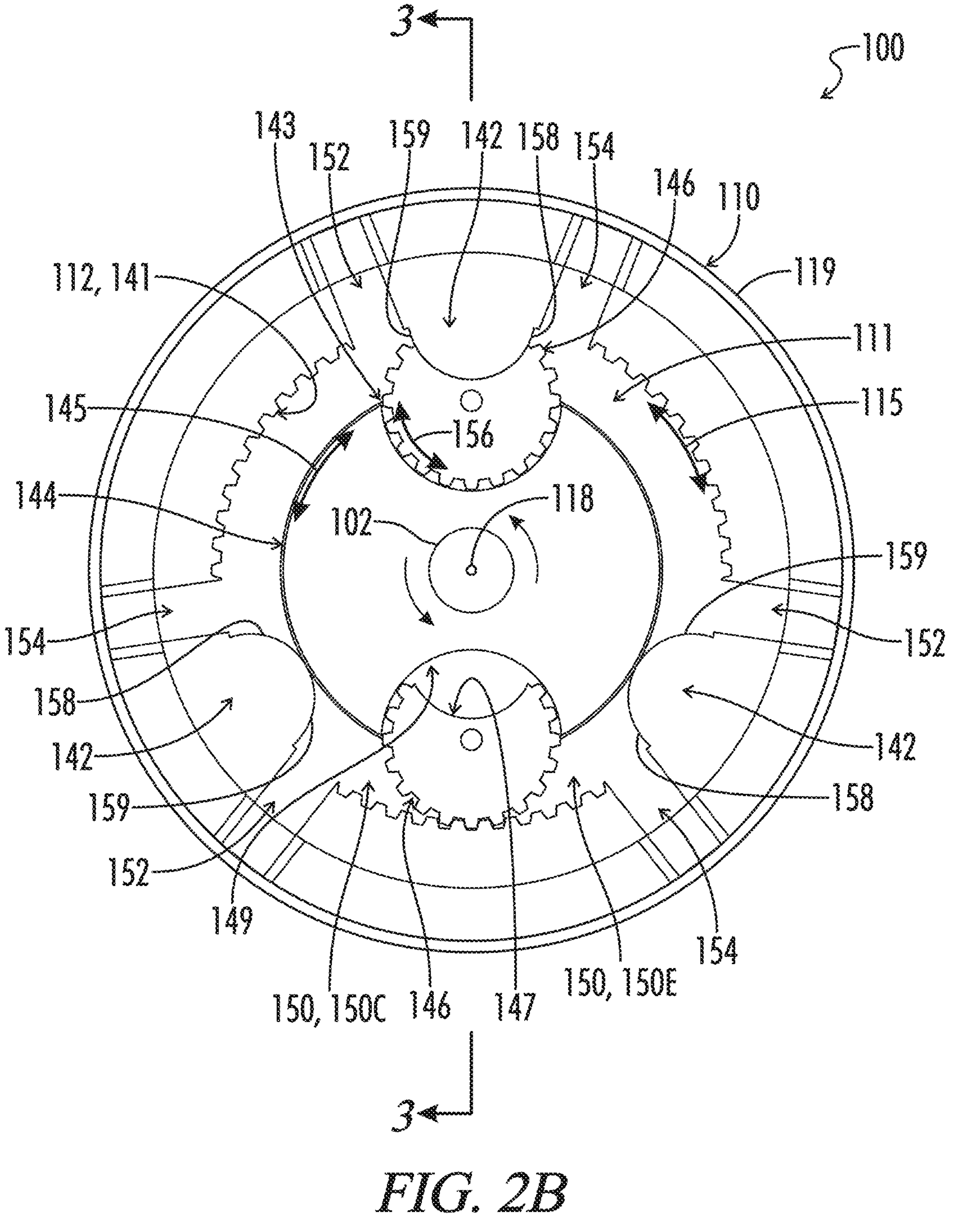
FIG. 2B is a cross-sectional view of the internal combustion rotary engine of FIG. 1A taken along lines 2B-2B of FIG. 1A in accordance with the present disclosure.
Figure 4B:
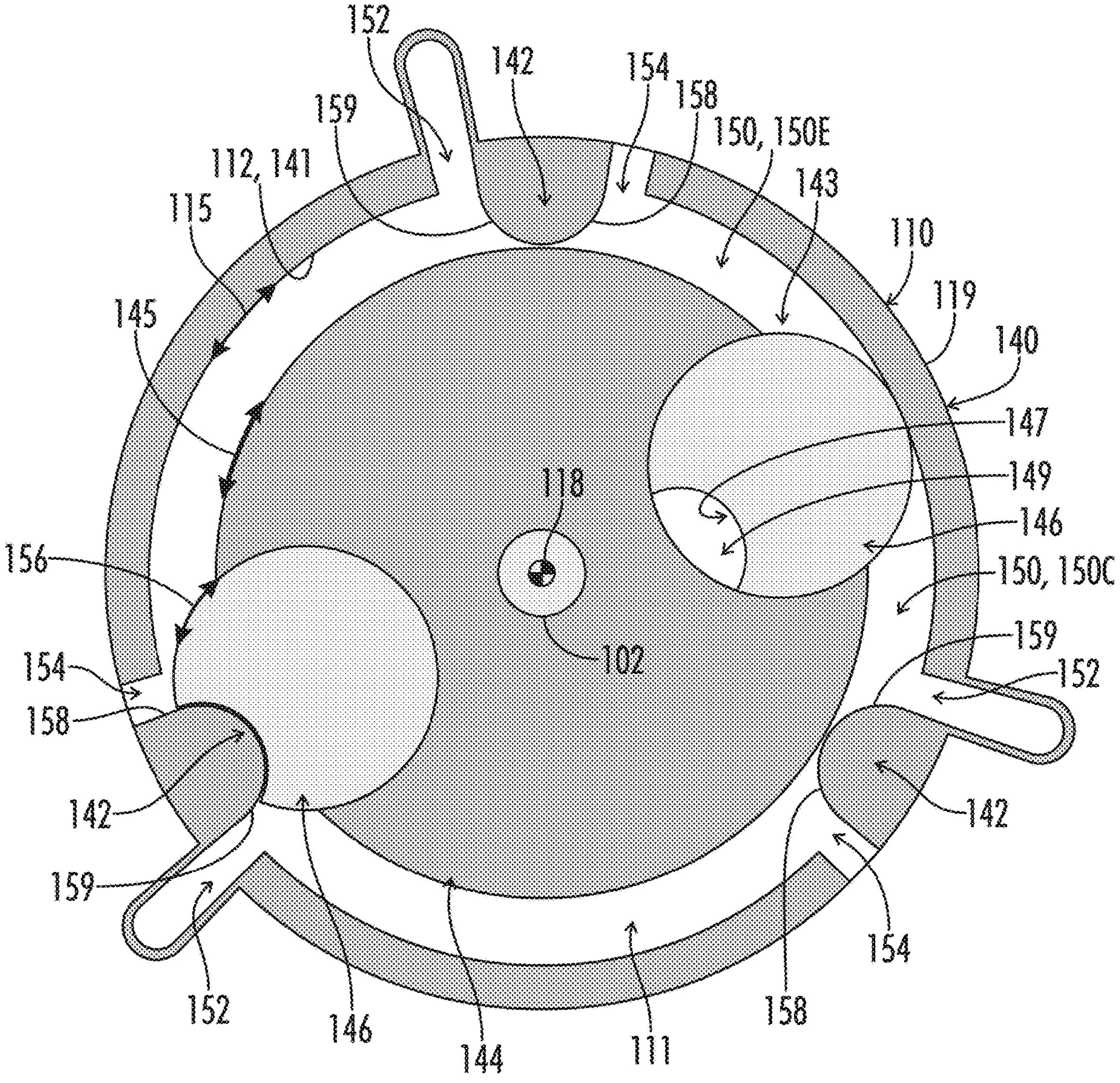
FIG. 4B is a cross-sectional view of an embodiment of internal combustion rotary engine of FIG. 3 in accordance with the present disclosure.

Referring to FIGS. 2B, 4B, and 5B, the hot side sun wheel 144 may rotate in a counterclockwise direction, as illustrated by the directional arrows. In other embodiments, the hot side sun wheel 144 may rotate in a clockwise direction, however, only the counterclockwise direction will be discussed. As the hot side sun wheel 144 turns, for example, counterclockwise, the at least one hot side planet wheel 146 approaches the at least one hot side lobe 142, thus defining an exhaust chamber 150E of the at least one hot side chamber 150. The exhaust chamber 150E may be defined between the at least one hot side planet wheel 146 and a hot side leading edge portion 158 of the at least one hot side lobe 142 approached by the at least one hot side planet wheel 146 when rotating along the hot side inner cylindrical surface 141. A combustion chamber 150C may be defined between the hot side planet wheel 146 and a hot side trailing edge portion 159 of the at least one hot side lobe 142 departed from by the at least one hot side planet wheel 146 when rotating along the hot side inner cylindrical surface 141.

As the at least one hot side planet wheel 146 departs from the hot side trailing edge portion 159 of the at least one hot side lobe 142 a combustion may occur in the combustion chamber 150C and cause further movement of the at least one hot side planet wheel 146 away from the hot side trailing edge portion 159 of the at least one hot side lobe 142. This in turn causes each of the hot and cold side sun wheels 124, 144 to rotate and the crankshaft 102 to rotate. The combustion may include combining compressed air from the cold side 120 received through the air lock passageway 160, with a fuel source (e.g., gas or the like), and igniting the mixture. The compressed air and fuel mixture may be received into the combustion chamber through an intake opening 152 via the air lock passageway 160. The intake opening 152 may be defined in the hot side inner cylindrical surface 141 proximate the hot side trailing edge portion 159 of each of the at least one hot side lobe 142. The intake opening 152 may also be referred to herein as an intake passageway 152. An exhaust output 154 may be defined in the hot side inner cylindrical surface 141 proximate the hot side leading edge portion 158 of each of the at least one hot side lobe 142. The exhaust output 154 may also be referred to herein as an exhaust passageway 154. The exhaust output 154 may be open to the exterior surface 119 of the housing 110, as illustrated in FIG. 1B. The exhaust output 154 may serve to output gasses left behind (e.g., remnants of a prior combustion) by the combustion process as the at least one hot side planet wheel 146 approaches the hot side leading edge portion 158 of the at least one hot side lobe 142. The exhaust output 154 may be coupled to an exhaust manifold 164 (shown in FIG. 6). The cold air output 132 and cold air intake 134 are illustrated in one possible location, but each may be located anywhere in the cold side chamber 130 and defined at any angle in the cold side inner cylindrical surface 121. The intake opening 152 and the exhaust output 154 are illustrated in one possible location, but each may be located anywhere in the hot side chamber 150 and defined at any angle in the hot side inner cylindrical surface 141.

As discussed above and as illustrated in FIGS. 2A-2B and 5B-5C, the inner cylindrical surface 112 may be toothed or include ridges (i.e., the cold side inner cylindrical surface 121 and the hot side inner cylindrical surface 141). In accordance with this embodiment, each of the at least one cold side planet wheel 126 and the at least one hot side planet wheel 146 may include teeth configured to mesh with those of the respective inner cylindrical surface 121, 141 as the respective planet wheel 126, 146 moves along the respective inner cylindrical surface 121, 141. In other optional embodiments, as illustrated in FIGS. 4A-4B, the cold side inner cylindrical surface 121 and the hot side inner cylindrical surface 141 may be smooth. In accordance with this embodiment, each of the at least one cold side planet wheel 126 and the at least one hot side planet wheel 146 may be smooth.

Figure 5C:
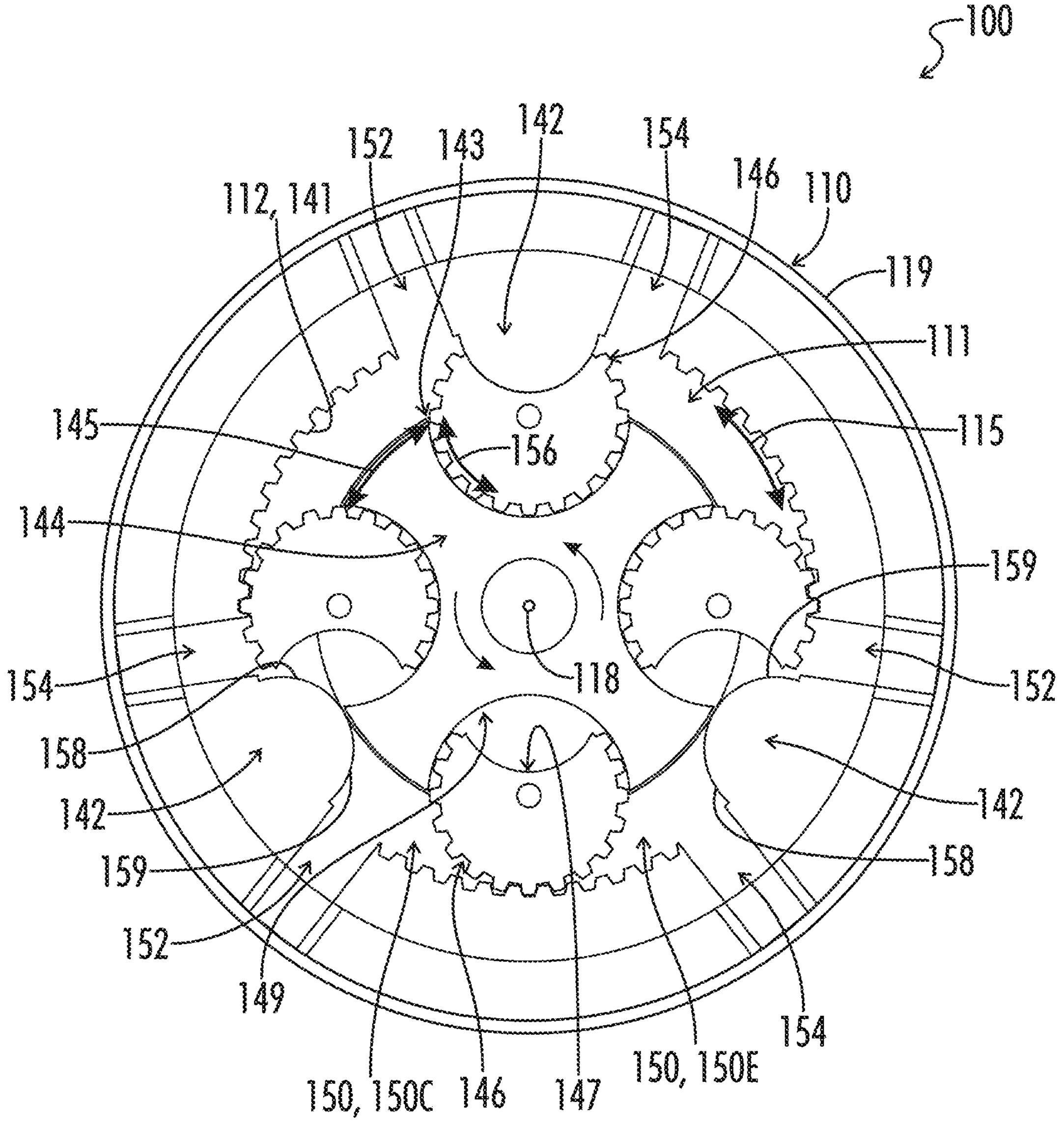
FIG. 5C is a cross-sectional view of the internal combustion rotary engine of FIG. 5A taken along lines 5C-5C of FIG. 5A in accordance with the present disclosure.

According to various different optional embodiments of the internal combustion rotary engine 100, the lobes and planet wheels may be infinitely customizable. For example, as shown in FIGS. 2A-2B and 4A-4B, each of the cold and hot sides 120, 140 may include two planet wheels and three lobes. Further for example, as shown in FIGS. 5B-5C, each of the cold and hot sides 120, 140 may include four planet wheels and three lobes. In other optional embodiments, the internal combustion rotary engine 100 may include other and/or different amounts of planet wheels and lobes on the cold and hot sides 120, 140. Generally, there should be at least one planet wheel and at least one lobe on the cold and hot sides 120, 140, however there can be as many as possible without touching. In certain optional embodiments, each of the at least one cold side planet wheel 126 may be aligned with each of the at least one hot side planet wheel 146, and each of the at least one cold side lobe 122 may be aligned with each of the at least one hot side lobe 142 relative to the central axis 118. In other optional embodiments, the planet wheels and lobes of the cold and hot sides 120, 140 may be offset from each other relative to the central axis 118. Generally, there are an equal number of planet wheels and lobes on each of the cold and hot sides 120, 140, however, in other optional embodiments the cold side 120 may have a different number of planet wheels and/or lobes than the hot side 140.

The at least one cold side lobe 122 may include three cold side lobes and the at least one hot side lobe 142 may include three hot side lobes which are equally spaced around an internal circumference 115 of the housing 110, respectively. In other optional embodiments, the internal combustion rotary engine 100 may include more or less cold side and hot side lobes 122, 142. The quantity of the at least one cold side lobe 122 and the at least one hot side lobe 142 is limitless, but directly impacts the size of the planet wheels as evidenced by the relationship disclosed below.

A planet wheel circumference 156 of the at least one hot side planet wheel 146 may be equal to a distance between the at least one hot side lobe 142 (center to center, leading edge to leading edge, or trailing edge to trailing edge). Alternatively, the distance may be a multiple of the planet wheel circumference 156. A planet wheel circumference 136 of the at least one cold side planet wheel 126 may be equal to a distance between the at least one hot side lobe 142 (center to center). Alternatively, the distance may be a multiple of the planet wheel circumference 136. This relationship is further discussed below when referring to the embodiment shown in FIGS. 11A-13.

When the internal combustion rotary engine 100 is powered by combustion or other pushing means on the power side (or hot side 140) and more than one sun wheel is used, the sun wheels must share a common shaft (e.g., be centered along the crankshaft 102). The geometry of this engine 100 can be scaled up or down to produce the required power output for applications from cargo ships and larger to nitro RC cars or smaller.

In consideration of using the internal combustion rotary engine 100 as a power converter utilizing other sources for power such as steam, water or air, or for pumping arrangements, the design of the engine can be modified using 4 planet wheels and 3 lobes (shown in FIGS. 5B-5C or any arrangement where there are more planet wheels than lobes, such as FIG. 12) in order to have the power source always pushing on the planet wheels to maintain the rotation (without having to provide a sophisticated set of valves to control the flow) or to have a more efficient generation of pumping force when used as a pump. In accordance with this embodiment, only one or more of the cold side 120 or the hot side 140 may be utilized. The following scenarios are good examples of where this modification could be used: This modification may be exceptionally useful for replacing turbines (water or air), pneumatic or hydraulic compressors, pneumatic or hydraulic pumps, steam engines utilizing steam from boilers powered by nuclear or other fuels, and combustion engines.

The engine can be powered by one sun wheel making designated usage of sealed chambers around the wheel for intake and compression as well as combustion and exhaust with the airlock chamber 160 making the connection between the cold side 120 and the hot side 140 as necessary. This is further disclosed below with regard to FIGS. 11A-13.

When more than one sun wheel is used, the planet wheels can be in phase or out of phase with other planet wheels on other sun wheels (e.g., the at least one cold side planet wheel 126 may or may not be in phase with the at least one hot side planet wheel 146). The airlock 160 routing can accommodate both in phase and out of phase planet wheels.

When considering the size relationship of the components of the engine 100, the following factors may be considered. One item to be considered is that the ID of the engine housing/block 110 is to be sized based on required power output. Another item to be considered is that the number of lobes 122, 142 on the ID of the housing/block 110 will dictate the size of the planet wheels 126, 146. Another item to be considered is that the circumference 136, 156 of the planet wheel 126, 146, respectively, has to be a distance that allows for the wheel to travel and step over the lobes at the proper time. Accordingly, this dictates the diameter of the planet wheel 126, 146. The planet wheel 126, 146 has to be able to rotate inside the ID of the housing/block 110 all the way around the circumference 115 and the planet wheel cutout(s) 127, 147 must step over all of the lobes 122, 142 in the ID of the housing/block 110 for the full 360 degree circle. Each planet wheel 126, 146 may have a plurality of planet wheel cutouts 127, 147 such that each planet wheel 126, 146 may step over multiple lobes 122, 142 per 360 degree rotation of the planet wheel 126, 146. A further item to be considered is that the diameter of the sun wheel 124, 144 has to be large enough to carry the connection mechanism for the planet wheels (shaft, bearings, etc. . . . ) and small enough to create the open chamber inside the engine housing/block 110. A still further item to be considered is that the lobes 122, 142 are to be sized to fill the gap between the ID of the housing/block 110 and the OD of the sun wheel 124, 144 (e.g., to maintain contact for purposes of sealing the chambers).

Figure 7:
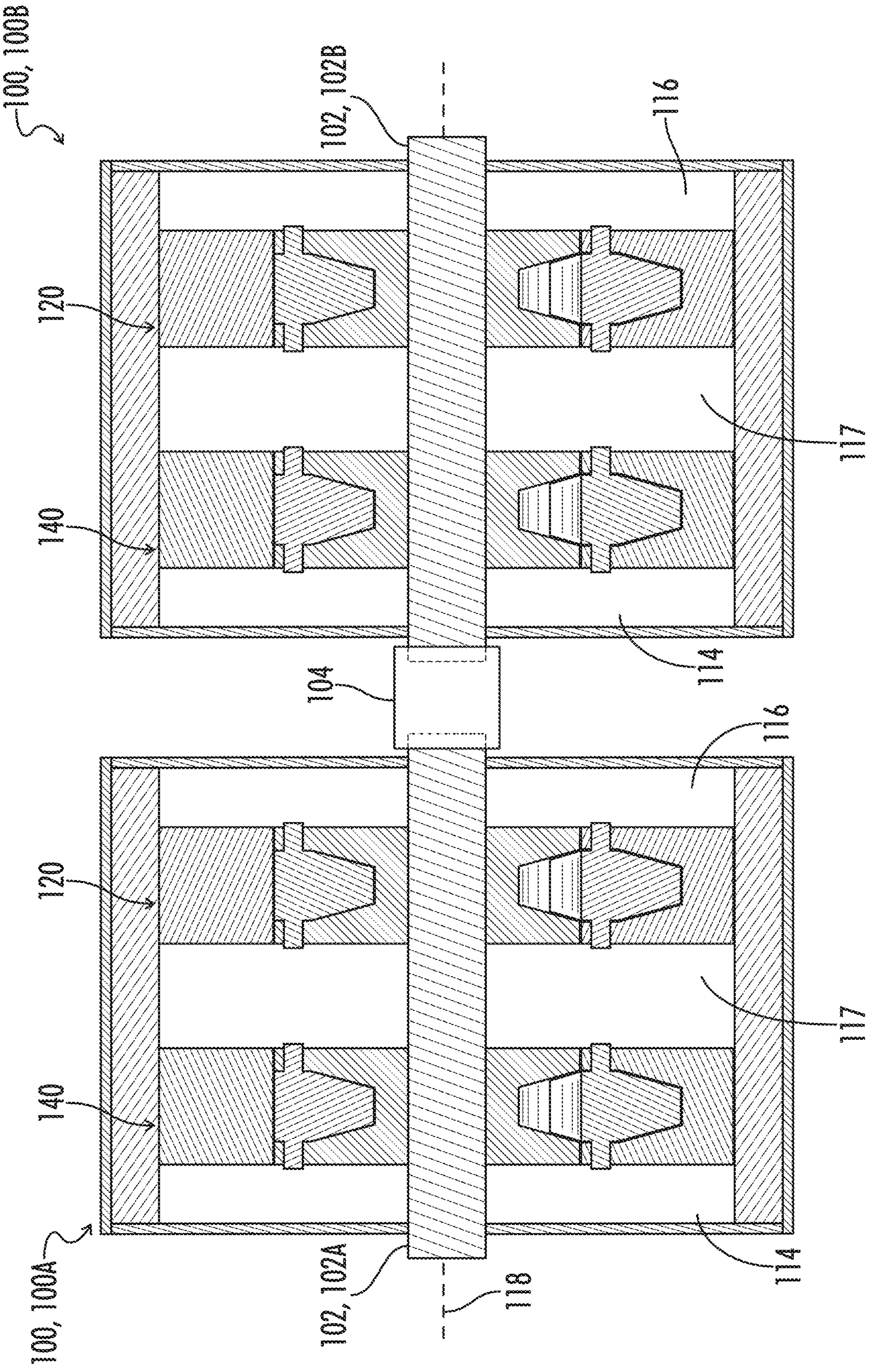
FIG. 7 is a cross-sectional view of a daisy-chained embodiment of the internal combustion rotary engine of FIG. 1A in accordance with the present disclosure.

Referring to FIG. 7, multiple internal combustion rotary engines 100 (e.g., 100A, 100B, etc.) may be daisy chained together along their crankshafts 102. The number of engines that may be daisy chained is theoretically limitless and may at least in part be determined by power output requirements, size constraints, and the like. Multiple crankshafts (e.g., 102A, 102B, . . . ) may be coupled together using a crankshaft coupling mechanism 104. The crankshaft coupling mechanism 104 may also be referred to herein as a crankshaft coupler 104. Each of the multiple crankshafts may be associated with a different internal combustion rotary engine 100A, 100B, respectively.

Figure 8:
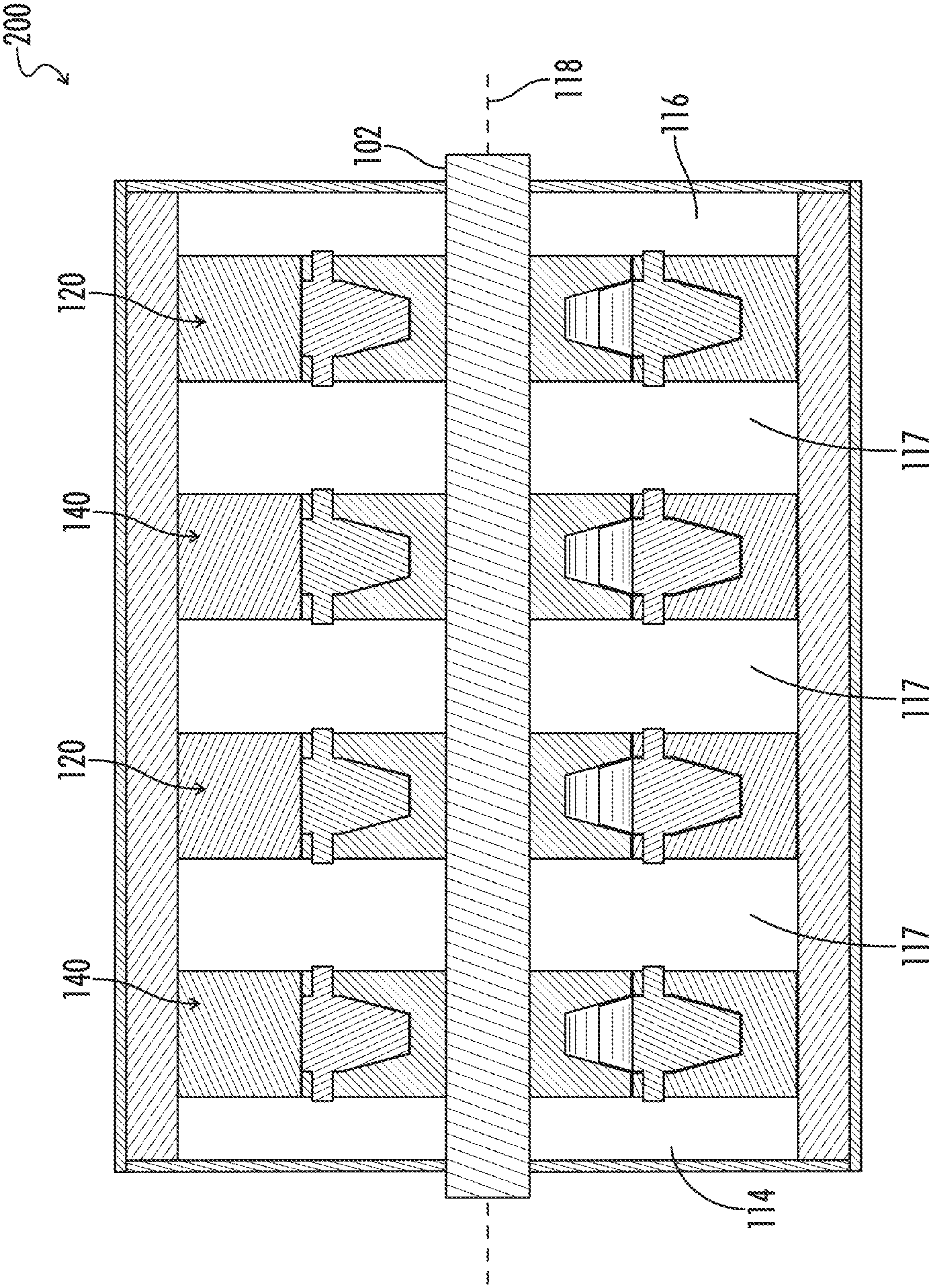
FIG. 8 is a cross-sectional view of a multistage embodiment of the internal combustion rotary engine similar to that of FIG. 1A in accordance with the present disclosure.

Referring to FIG. 8, an embodiment of a multistage internal combustion rotary engine 200 is illustrated. Similar elements and features of the multistage internal combustion rotary engine 200 are numbered similarly and may function similar to those of the internal combustion rotary engine 100. The multistage internal combustion rotary engine 200 includes at least two cold sides 120A, 120B and at least two hot sides 140A, 140B contained in a single housing 110, or in other words an equal number of cold and hot sides. The cold sides 120A, 120B and the hot sides 140A, 140B of the multistage internal combustion rotary engine 200 alternate so as to function and be mechanically configured similarly that of the internal combustion rotary engine 100. In other optional embodiments, the colds sides 120A, 120B may be positioned adjacent to each other and the hot sides 140A, 140B may be positioned adjacent to each other. This configuration may more simply separate the cold air intakes from the exhaust outputs. In other optional embodiments, the multistage internal combustion rotary engine 200 may include an unequal number of colds sides 120A, 120B and hot sides 140A, 140B.

Figure 9:
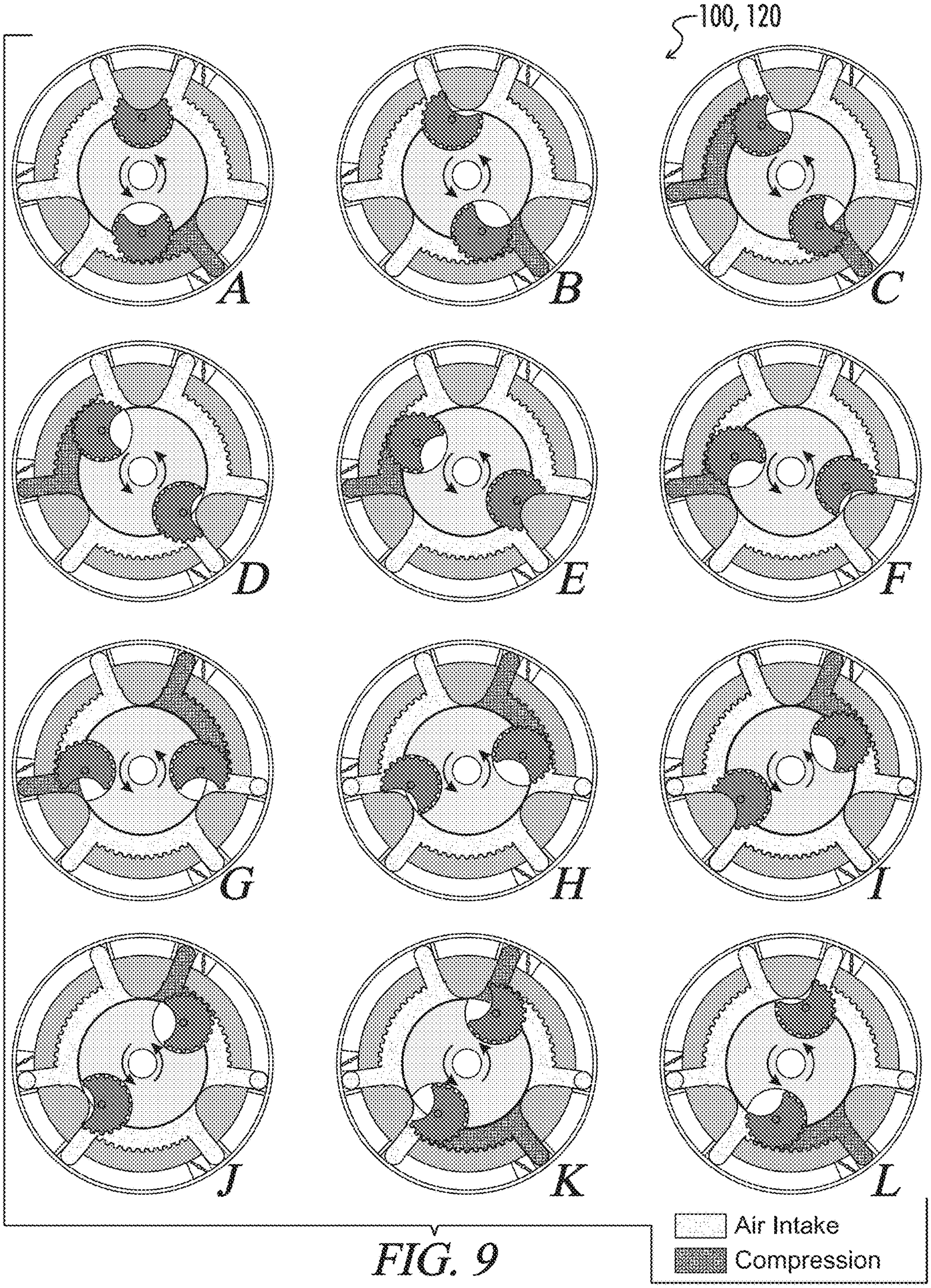
FIG. 9 is a cross-sectional view of the cold side of the internal combustion rotary engine of FIG. 3A illustrating sequential steps A-L of air intake and air compression over 180-degrees in 30-degree increments in accordance with the present disclosure.
Figure 10:
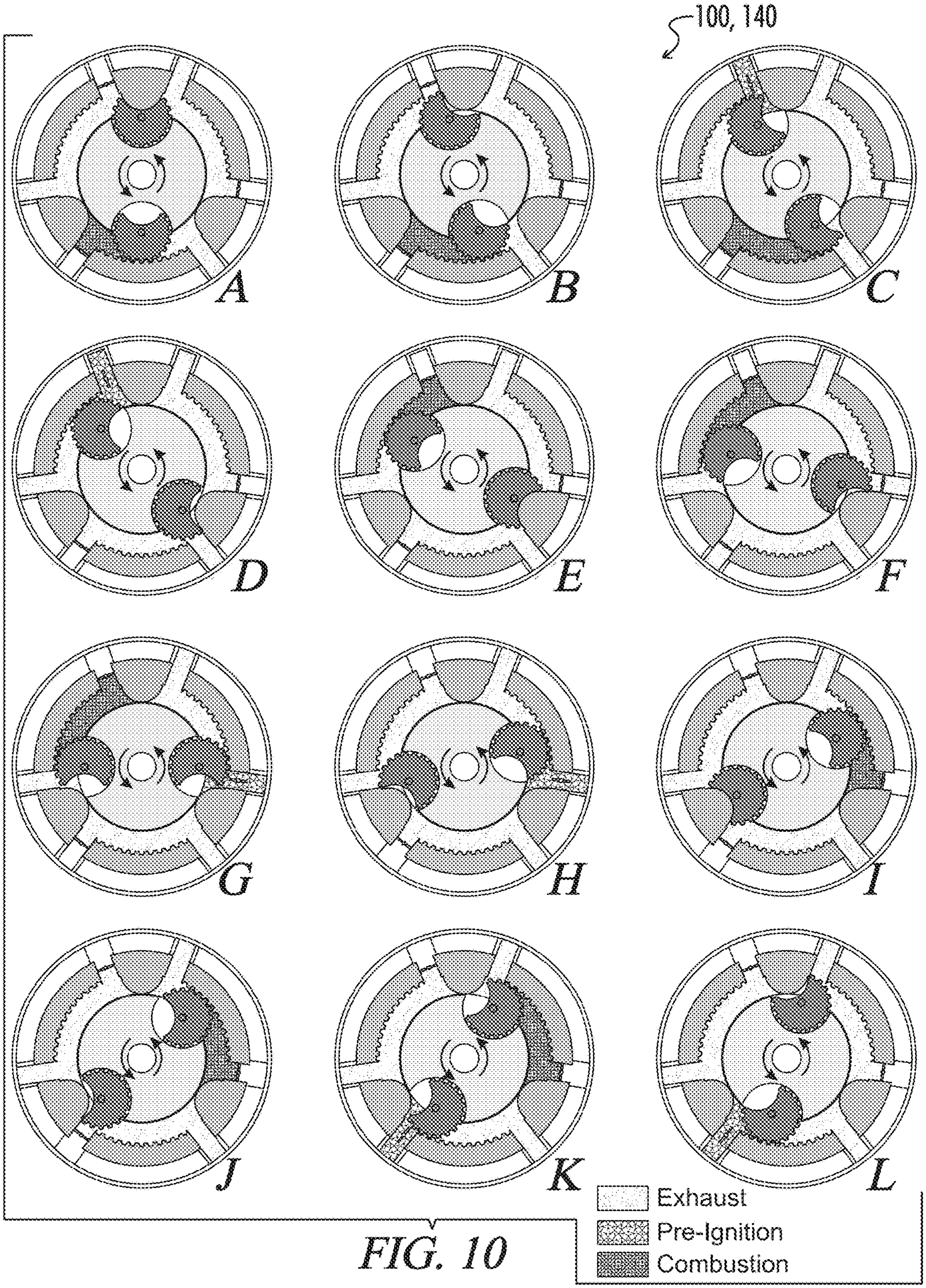
FIG. 10 is a cross-sectional view of the hot side of the internal combustion rotary engine of FIG. 3B illustrating sequential steps A-L of combustion and exhaust over 180-degrees in 30-degree increments in accordance with the present disclosure.

Referring to FIG. 9, a series of cross-sectional views of the cold side 120 of the internal combustion rotary engine 100 are shown. The series of drawings illustrate sequential steps A-L of air intake and air compression occurring (e.g., shaded accordingly) in the air intake and compression chambers 1301, 130C, respectively, over 180-degrees of rotation of the cold side sun wheel 124 and separated by 30-degree increments. Referring to FIG. 10, a series of cross-sectional views of the hot side 140 of the internal combustion rotary engine 100 are shown. The series of drawings illustrate sequential steps A-L of pre-ignition, combustion, and exhaust (e.g., shaded accordingly) occurring in the combustion and exhaust chambers 150C, 150E, respectively, over 180-degrees of rotation of the hot side sun wheel 144 and separated by 30-degree increments.

Referring to FIGS. 11A-13, an embodiment of a single sun wheel internal combustion rotary engine 300 is illustrated. The single sun wheel internal combustion rotary engine 300 may also be referred to herein as an internal combustion rotary engine 300. The internal combustion rotary engine 300 may include a housing 310 configured to receive a crankshaft 302 along a central axis 318 of the housing 310. The housing 310 includes at least one cylindrical compartment 311 having an inner cylindrical surface 312 centered about the central axis 318. The housing 310 may further include a front housing cover plate 314 and a rear housing cover plate 316 coupled to opposite ends of the at least one cylindrical compartment 311 and centered about the central axis 318. The inner cylindrical surface 312 may include at least one lobe 320 extending from the inner cylindrical surface 312. The at least one lobe 320 may be partially cylindrical and oriented parallel to the central axis 318.

Figure 12:
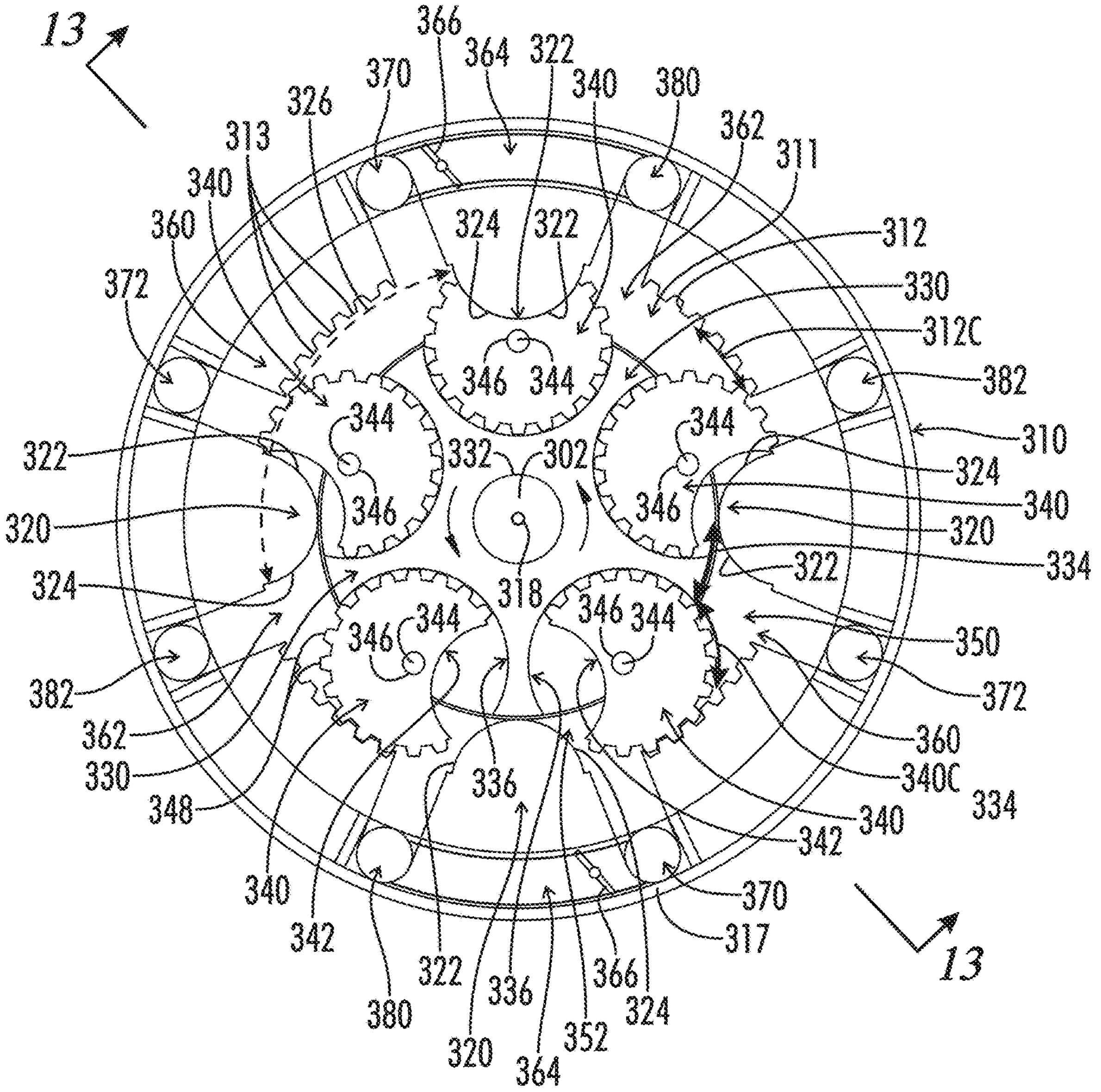
FIG. 12 is a cross-sectional view of the internal combustion rotary engine of FIG. 11A taken along lines 12-12 of FIG. 11A in accordance with the present disclosure.

As illustrated in FIG. 12, the internal combustion rotary engine 300 may further include a sun wheel 330 positioned within the at least one cylindrical compartment 311 and centered about the central axis 318. The sun wheel 330 may be configured to couple to the crankshaft 302 via a central opening 332 of the sun wheel 330. The sun wheel 330 may include a sun wheel circumference 334 and at least one semicylindrical receptable 336 defined along the sun wheel circumference 334. The at least one semicylindrical receptable 336 may be narrower than a width of the sun wheel 330 defined parallel to the central axis 318. The sun wheel 330 is sized to maintain contact with the at least one lobe 320 as the sun wheel rotates about the central axis 318.

The internal combustion rotary engine 300 may further include at least one planet wheel 340 received in the at least one semicylindrical receptable 336 of the sun wheel 330 such that one planet wheel 340 is associated with each of the at last one semicylindrical receptable 336. The at least one planet wheel 340 may be configured to engage the inner cylindrical surface 312 of the at least one cylindrical compartment 311. The at least one planet wheel 340 may include at least one indentation 342 configured to be received by the at least one lobe 320 when the at least one planet wheel 340 rotates along the inner cylindrical surface 312. The at least one indentation 342 may also be referred to herein as a partially cylindrical opening 342.

The internal combustion rotary engine 300 may further include side seals 319 positioned along the inner cylindrical surface 312 on opposite sides of the at least one planet wheel 340. The side seals 319 may extend between the inner cylindrical surface 312 and the sun wheel 330, and further extend between the front and rear housing cover plates 314, 316 and the opposites sides of the at least one planet wheel 340. The side seals 319 may also be referred to as a seal walls 319 and may be attached or integrally formed with the housing 310.

As illustrated in FIG. 12, the sun wheel 330 may rotate counterclockwise, as indicated by the directional rotation arrows. In other embodiments, the sun wheel 330 may rotate clockwise. As the at least one planet wheel 340 is sealed between the sun wheel 330, the inner cylindrical surface 312, and the side seals 319, a leading edge chamber 350 and a trailing edge chamber 352 may be defined when the at least one planet wheel 340 rotates along the inner cylindrical surface 312. The leading edge chamber 350 may be defined between the at least one planet wheel 340 and a leading edge portion 322 of the at least one lobe 320 as the at least one planet wheel 340 approaches the at least one lobe 320 when rotating along the inner cylindrical surface 312 of the at least one cylindrical compartment 311. The trailing edge chamber 352 may be defined between the at least one planet wheel 340 and a trailing edge portion 324 of the at least one lobe 320 as the at least one planet wheel 340 departs from the at least one lobe 320 when rotating along the inner cylindrical surface 312 of the at least one cylindrical compartment 311.

One of air compression or exhaust may be performed by the internal combustion rotary engine 300 in the leading edge chamber 350. Similarly, one of air intake or combustion may be performed by the internal combustion rotary engine 300 in the trailing edge chamber 352.

As illustrated in FIG. 12, the at least one lobe 320 comprises four lobes equally spaced around the inner cylindrical surface 312 and the at least one planet wheel 340 comprises five planet wheels 340 equally spaced around the sun wheel 330. The space between adjacent lobes of the four lobes may define one of a hot chamber 360 or a cold chamber 362. For example, as the at least one planet wheel 340 moves between lobes 320, it may alternatingly transition between the hot chamber 360 and the cold chamber 362 for each successive lobe 320. Each of the hot chamber 360 and the cold chamber 362 may include the leading edge chamber 350 and the trailing edge chamber 352 defined therein as the at least one planet wheel 340 moves through said hot or cold chamber 360, 362. Each of the cold chambers 362 may function similar to the cold side 120 of the internal combustion rotary engine 100 and each of the hot chambers 360 may function similar to the hot side 140 of the internal combustion rotary engine 100. In certain other optional embodiments, the at least one cylindrical compartment 311 may include at least one hot compartment and at least one cold compartment similar to the internal combustion rotary engine 100 shown in FIGS. 1A-10L.

Figure 11A:
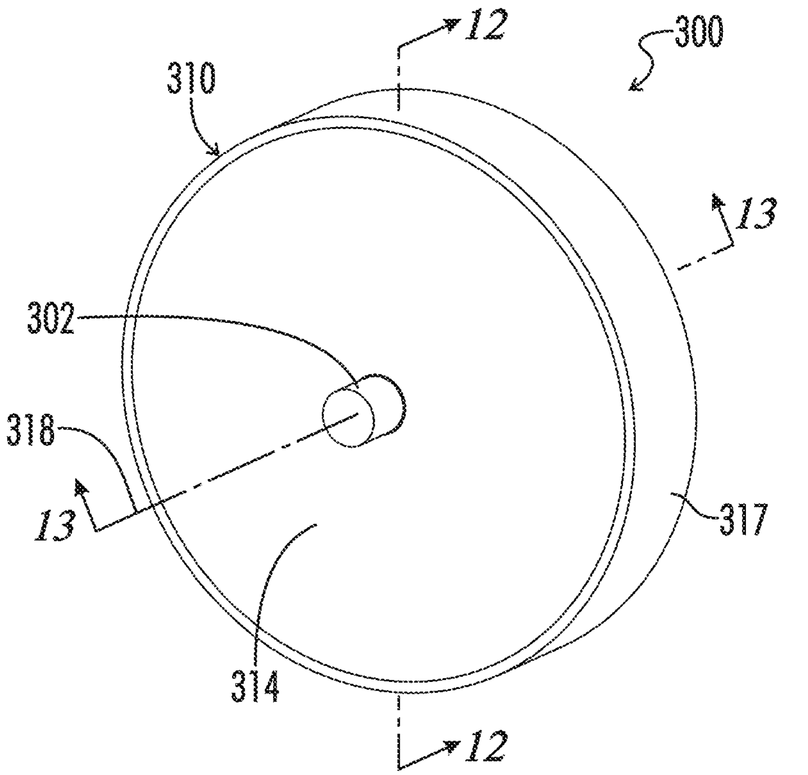
FIG. 11A is a perspective view of an internal combustion rotary engine in accordance with the present disclosure.
Figure 11B:
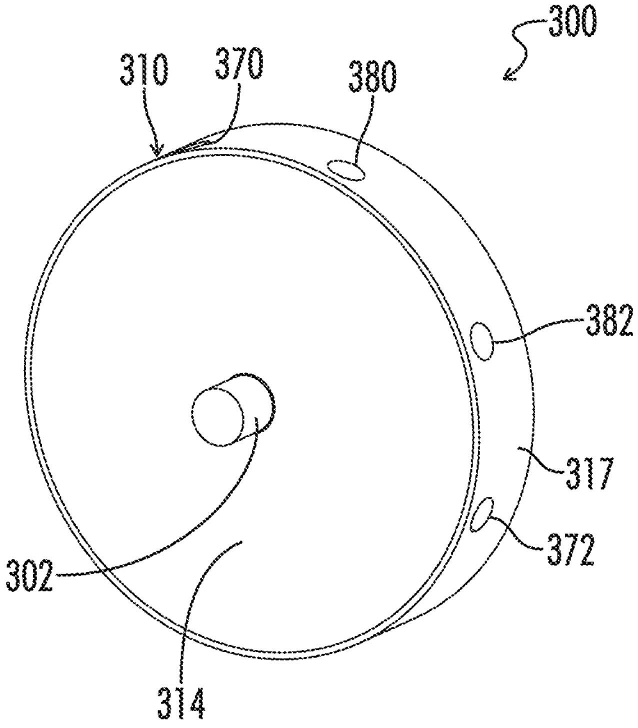
FIG. 11B is a perspective view of an internal combustion rotary engine with openings open to an exterior surface of the housing in accordance with the present disclosure.

Each hot chamber 360 may include an intake opening 370 and an exhaust output 372. Each cold chamber 362 may include a cold air output 380 and a cold air intake 382. Each of the intake opening 370, the exhaust output 372, the cold air output 380, and the cold air intake 382 may function similar to the intake opening 152, the exhaust output 154, the cold air output 132, and the cold air intake 134 of the internal combustion rotary engine 100. In this embodiment, however, the cold air output 380 may be coupled to the following intake opening 370 (e.g., via an airlock passageway 364 which may include a throttle valve 366 for controlling the fuel/air ratio or the like) in a direction of rotation of the sun wheel 330 such that air compression occurs in the immediately preceding chamber prior to combustion. Alternatively, each hot chamber 360 may intake compressed air from any one of the cold chambers 362 or from a combination of the cold chambers 362. At least the exhaust output 372 and the cold air input 382 may be open to an exterior surface 317 of the housing 310, as illustrated in FIG. 11B. The intake opening 370 and exhaust output 372 are illustrated in one possible location, but each may be located anywhere in the hot chamber 360 and defined at any angle. The cold air output 380 and cold air intake 382 are illustrated in one possible location, but each may be located anywhere in the cold chamber 362 and defined at any angle.

As illustrated in FIG. 12, each of the at least one lobe 320 may be equally spaced around an inner cylindrical surface circumference 312C of the inner cylindrical surface 312 and may extend between the front and rear housing cover plates 314, 316. The positioning of the at least one lobe 320 may allow for air and fluid to flow between the front and rear housing cover plates 314, 316 and the side seals 319. The inner cylindrical surface circumference 312C may be divisible by a planet wheel circumference 340C of each of the at least one planet wheel 340. Each of the at least one planet wheel may include a planet wheel circumference depending at least in part on a distance 326 between the leading edge portion 322 (or any other reference point) of successive lobes of the at least one lobe 320. In certain optional embodiment, when only one lobe is present, the distance 326 may equal the inner cylindrical surface circumference 312C. The planet wheel circumference 340C of each of the at least one planet wheel 340 may be less than or equal to the distance 326 between the leading edge portion 322 of the at least one lobe 320. The distance 326 between the leading edge portion 322 of the at least one lobe 320 may be divisible by the planet wheel circumference 340C of each of the at least one planet wheel 340. A first element being "divisible by" a second element may mean that when the first element is divided by the second element, the result is an integer with a remainder of zero. As such, precision milling of and the size relationship between the various parts of the internal combustion rotary engine 300 is of the utmost importance.

Figure 13:
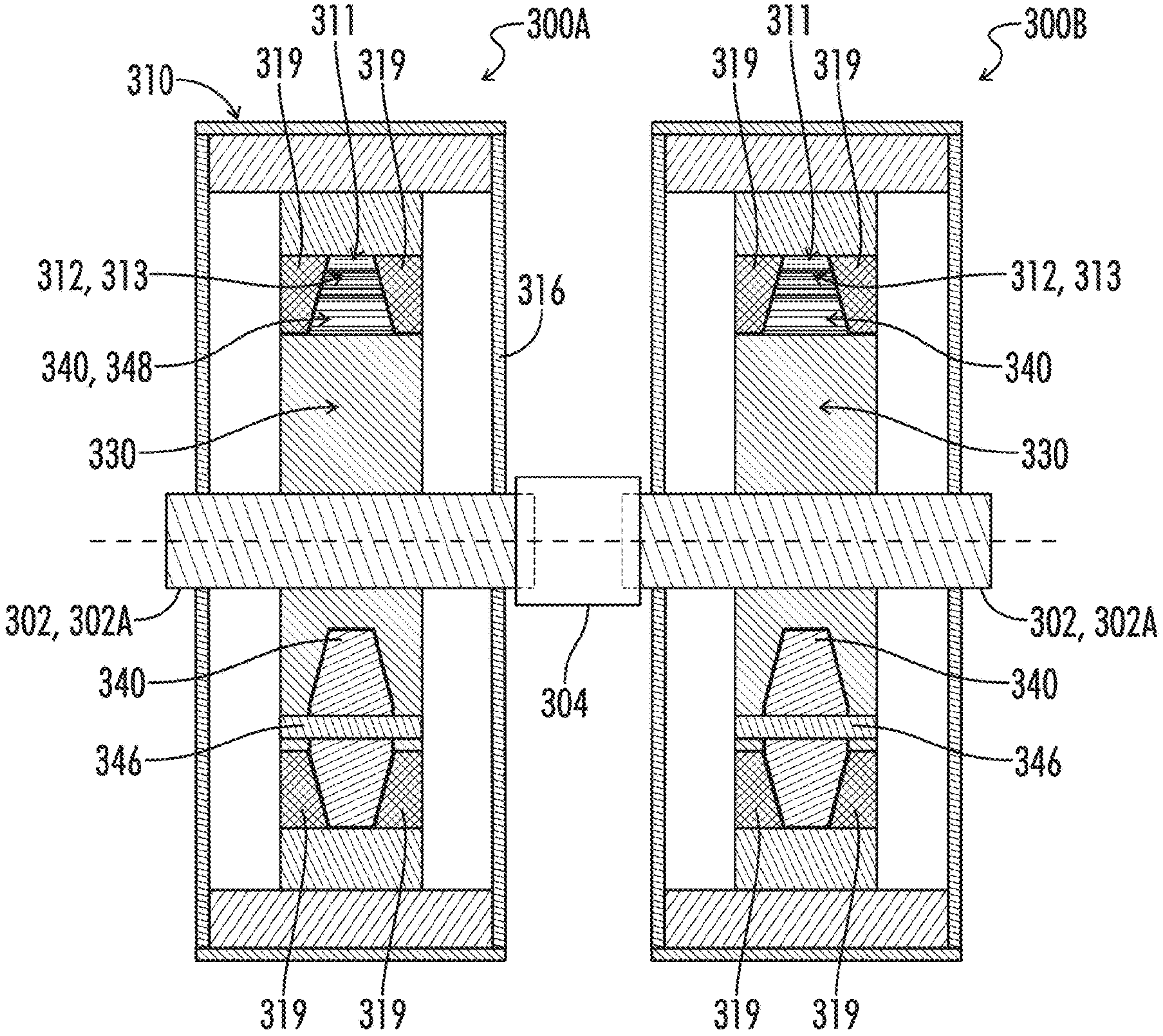
FIG. 13 is a cross-sectional view of the internal combustion rotary engine of FIG. 11A taken along lines 13-13 of FIG. 11A in accordance with the present disclosure.

As illustrated in FIGS. 12-13, each of the at least one planet wheel 340 may include a planet wheel rotational axis 344 positioned interiorly of the sun wheel circumference 334. Each of the at least one planet wheel 340 may be rotatably coupled to the sun wheel 330, for example, using a planet wheel axle 346 positioned along the planet wheel rotational axis 344 associated with the respective at least one planet wheel 340.

As illustrated in FIG. 12 and discussed above with reference to the internal combustion rotary engine 100, the inner cylindrical surface 312 may include a plurality of teeth 313 elongated parallel to the central axis 318 and spaced apart along the inner cylindrical surface circumference 312C between each of the at least one lobe 320. One of ordinary skill in the art will appreciate that the plurality of teeth 313 could also be oriented in a diagonal fashion or a variation thereof. The plurality of teeth 313 may also be referred to herein as a plurality of geared teeth 313. The at least one planet wheel 340 may include a plurality of planet wheel teeth 348 configured to mesh with the plurality of teeth 313 of the inner cylindrical surface 312 when the at least one planet wheel 340 rotates along the inner cylindrical surface 312. In certain other optional embodiments, each of the inner cylindrical surface 312 and the at least one planet wheel may be smooth. The aforementioned teeth may, however, help prevent slippage and misalignment of the at least one indentation 342 of the at least one planet wheel 340 with the at least one lobe 320 as the at least one planet wheel 340 rotates along the inner cylindrical surface 312. In further optional embodiments (not shown), the planet wheel axle may include a gearing configured to control rotation of the at least one planet wheel 340 based upon rotation of the sun wheel 330, or vice versa.

As illustrated in FIG. 13, a plurality of internal combustion rotary engines 300 (e.g., 300A, 300B, etc.) may be daisy chained together along their crankshafts 102. The number of engines that may be daisy chained is theoretically limitless and may at least in part be determined by power output requirements, size constraints, and the like. When the plurality of internal combustion rotary engines 300 are daisy chained together, the rotational speed of each of the plurality of internal combustion rotary engines 300 is uniform. Multiple crankshafts (e.g., 302A, 302B, . . . ) may be coupled together using a crankshaft coupling mechanism 304. The crankshaft coupling mechanism 304 may also be referred to herein as a crankshaft coupler 304. Each of the multiple crankshafts may be associated with a different internal combustion rotary engine 300A, 300B, respectively, or alternatively the plurality of internal combustion rotary engines may be coupled along a single crankshaft 302.

Figure 14:
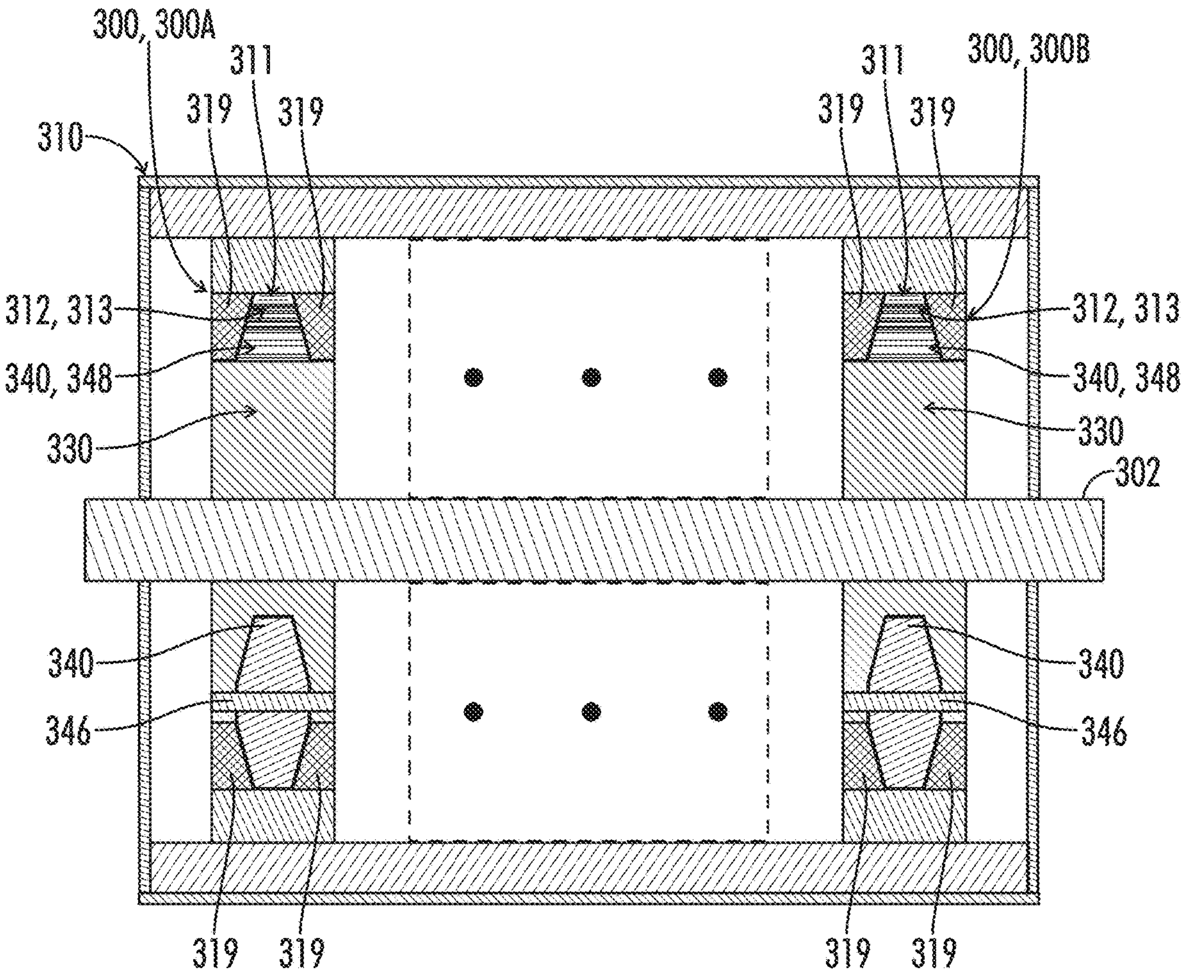
FIG. 14 is a cross-sectional view of a multistage embodiment of the internal combustion rotary engine similar to that of FIG. 11A in accordance with the present disclosure.

Referring to FIG. 14, an embodiment of a multistage internal combustion rotary engine 400 is illustrated. Similar elements and features of the multistage internal combustion rotary engine 400 are numbered similarly and may function similar to those of the internal combustion rotary engine 300. The multistage internal combustion rotary engine 400 may include multiple of internal combustion rotary engines 300 sequentially positioned within a single housing 110 along a single crankshaft 302. This embodiment may save space and allow for better management of the air intakes and exhaust ports as compared to that shown in FIG. 11.

As the number of lobes and planet wheels is increased, the number of compression cycles and combustion cycles per revolution of the respective sun wheels may increase.

Aspects of the internal combustion rotary engine 300, even while not explicitly discussed with reference to other embodiments are nevertheless equally applicable to the internal combustion rotary engine 100 and one of skill in the art would appreciate the same without departing from the spirit or scope of the present disclosure.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims. Other elements, such as fuel likes, injection ports, and other aspects of the invention, while not illustrated, will be readily understood and may be implemented without undue experimentation by a person of ordinary of skill in the art.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. An internal combustion rotary engine configured to rotate a crankshaft, the internal combustion rotary engine comprising:

a housing configured to receive the crankshaft along a central axis of the housing, the housing including a cold side compartment separated from a hot side compartment along the central axis, the cold side compartment including a cold side inner cylindrical surface having at least one cold side lobe extending therefrom, the hot side compartment including a hot side inner cylindrical surface having at least one hot side lobe extending therefrom;

a cold side planetary gear set having a cold side sun wheel centered about the central axis and at least one cold side planet wheel rotatably coupled to the cold side sun wheel and sealed between the cold side sun wheel and the cold side inner cylindrical surface, the cold side sun wheel including a cold side sun wheel circumference and at least one cold side semicircular opening defined along the cold side sun wheel circumference and configured to at least partially receive the at least one cold side planet wheel, the at least one cold side planet wheel including at least one cold side planet wheel indentation configured to at least partially receive the at least one cold side lobe when the at least one cold side planet wheel rotates along the cold side inner cylindrical surface;

a hot side planetary gear set having a hot side sun wheel centered about the central axis and at least one hot side planet wheel rotatably coupled to the hot side sun wheel and sealed between the hot side sun wheel and the hot side inner cylindrical surface, the hot side sun wheel including a hot side sun wheel circumference and at least one hot side semicircular opening defined along the hot side sun wheel circumference and configured to at least partially receive the at least one hot side planet wheel, the at least one hot side planet wheel including at least one hot side planet wheel indentation configured to at least partially receive the at least one hot side lobe when the at least one hot side planet wheel rotates along the hot side inner cylindrical surface;

an air compression chamber defined between the at least one cold side planet wheel and a cold side leading edge portion of the at least one cold side lobe as the at least one cold side planet wheel approaches the at least one cold side lobe when rotating along the cold side inner cylindrical surface;

a combustion chamber defined between the at least one hot side planet wheel and a hot side trailing edge portion of the at least one hot side lobe as the at least one hot side planet wheel departs from the at least one hot side lobe when rotating along the hot side inner cylindrical surface; and at least one compression passageway defined between the cold side inner cylindrical surface proximate to the cold side leading edge portion of the at least one cold side lobe and the hot side inner cylindrical surface proximate to the hot side trailing edge portion of the at least one hot side lobe.

2. The internal combustion rotary engine of claim 1, wherein:

the cold side inner cylindrical surface includes a plurality of teeth elongated parallel to the central axis and spaced apart along an inner cylindrical surface circumference of the inner cylindrical surface between lobes; and the at least one planet wheel includes a plurality of planet wheel teeth configured to mesh with the plurality of teeth of the cold side inner cylindrical surface when the at least one planet wheel rotates along the cold side inner cylindrical surface.

3. The internal combustion rotary engine of claim 1, wherein:

a plurality of internal combustion rotary engines are sequentially couplable to the crankshaft.

4. The internal combustion rotary engine of claim 1, wherein:

each of the at least one cold side lobe is aligned with each of the at least one hot side lobe relative to the central axis.

5. The internal combustion rotary engine of claim 1, wherein:

the at least one cold side lobe is equal in number to the at least one hot side lobe.

6. The internal combustion rotary engine of claim 1, wherein:

an exhaust chamber is defined between the at least one hot side planet wheel and a hot side leading edge portion of the at least one hot side lobe as the at least one hot side planet wheel approaches the at least one hot side lobe when rotating along the hot side inner cylindrical surface.

7. The internal combustion rotary engine of claim 6, further comprising:

at least one exhaust passageway defined between an exterior surface of the housing and the hot side inner cylindrical surface proximate to the hot side leading edge portion of the at least one hot side lobe.

8. The internal combustion rotary engine of claim 1, wherein:

each of the at least one cold side lobes is equally spaced around an inner cylindrical surface circumference of the cold side inner cylindrical surface.

9. The internal combustion rotary engine of claim 8, wherein:

the cold side inner cylindrical surface circumference is divisible by a planet wheel circumference of each of the at least one cold side planet wheel.

10. The internal combustion rotary engine of claim 1, wherein:

each of the at least hot side lobes is equally spaced around an inner cylindrical surface circumference of the hot side inner cylindrical surface.

11. The internal combustion rotary engine of claim 10, wherein:

the hot side inner cylindrical surface circumference is divisible by a planet wheel circumference of each of the at least one hot side planet wheel.

12. The internal combustion rotary engine of claim 1, wherein:

an air intake chamber is defined between the at least one cold side planet wheel and a cold side trailing edge portion of the at least one cold side lobe as the at least one cold side planet wheel departs from the at least one cold side lobe when rotating along the cold side inner cylindrical surface.

13. The internal combustion rotary engine of claim 12, further comprising:

at least one air intake passageway defined between an exterior surface of the housing and the cold side inner cylindrical surface proximate to the cold side trailing edge portion of the at least one cold side lobe.

* * * * *